United States Patent
Yoshioka

(10) Patent No.: US 8,780,043 B2
(45) Date of Patent: Jul. 15, 2014

(54) INFORMATION SELECTING APPARATUS, STORAGE MEDIUM STORING INFORMATION SELECTING PROGRAM, GAME APPARATUS, AND STORAGE MEDIUM STORING GAME PROGRAM

(75) Inventor: Yasuhiro Yoshioka, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1156 days.

(21) Appl. No.: 11/802,331

(22) Filed: May 22, 2007

(65) Prior Publication Data

US 2008/0222571 A1 Sep. 11, 2008

(30) Foreign Application Priority Data

Mar. 6, 2007 (JP) ................... 2007-055491

(51) Int. Cl.
*G06F 3/033* (2013.01)
(52) U.S. Cl.
USPC ........... 345/161; 345/156; 345/157; 345/173; 715/825; 715/828; 715/863; 715/864
(58) Field of Classification Search
USPC .......... 345/156–173; 715/810, 825, 828, 829, 715/835, 845, 863–864
See application file for complete search history.

(56) References Cited

U.S. PATENT DOCUMENTS

| | | | |
|---|---|---|---|
| 6,011,542 A * | 1/2000 | Durrani et al. | 345/156 |
| 6,567,072 B2 * | 5/2003 | Watanabe | 345/161 |
| 6,636,197 B1 * | 10/2003 | Goldenberg et al. | 345/156 |
| 6,788,288 B2 * | 9/2004 | Ano | 345/157 |
| 6,963,332 B1 * | 11/2005 | Watanabe | 345/161 |
| 7,075,527 B2 * | 7/2006 | Takagi et al. | 345/184 |
| 7,091,998 B2 * | 8/2006 | Miller-Smith | 715/810 |
| 7,218,781 B2 * | 5/2007 | van Meurs | 382/185 |
| 7,397,467 B2 * | 7/2008 | Park et al. | 345/173 |
| 7,446,755 B1 * | 11/2008 | Goren | 345/161 |
| 7,737,944 B2 * | 6/2010 | Harrison et al. | 345/156 |
| 2002/0101458 A1 * | 8/2002 | SanGiovanni | 345/863 |
| 2003/0128241 A1 * | 7/2003 | Watanabe et al. | 345/810 |
| 2004/0130529 A1 * | 7/2004 | Magara | 345/161 |
| 2004/0252819 A1 * | 12/2004 | Miyata | 379/201.01 |
| 2005/0081164 A1 * | 4/2005 | Hama et al. | 715/830 |
| 2005/0140657 A1 * | 6/2005 | Park et al. | 345/169 |
| 2008/0222318 A1 * | 9/2008 | Yoshioka | 710/31 |

FOREIGN PATENT DOCUMENTS

| | | |
|---|---|---|
| JP | 2000-10716 | 1/2000 |
| JP | 2000-194693 | 7/2000 |
| JP | 2003-111977 | 4/2003 |
| JP | 2005-173877 | 6/2005 |

* cited by examiner

*Primary Examiner* — Jason Mandeville
(74) *Attorney, Agent, or Firm* — Nixon & Vanderhye PC

(57) ABSTRACT

An information selecting apparatus includes a CPU and a controller capable of performing a direction input. An arbitrary item is selected from a plurality of items by a direction input by means of an analog joystick, for example. When it is determined that a predetermined series of direction input operations is performed, at least one item out of selection items is switched to another item.

16 Claims, 23 Drawing Sheets

(A)

(B)

(A)

(B)

PAGE UP/DOWN

FIG. 15

ITEM DATA i[1]　　　　　　　　　　　　　　　　　　　　　　　　　　i[32]
| abcdefghijklmnopqrstuvwxyz | i[33]　　　　　　　　　　　　　　　　　　　　　　　　　　i[64]
| !"#$%'()*+,-./:;0.1.2.3[]4[]5[]6789 | i[65]　　　　　　　　　　　　　　　　　　　　　　　　　　i[96]
| [].[].[][][][][][][][][][][][] |

CHARACTER STRING DATA i[56] = " 255."
i[58] = " 172.16."
i[60] = " 192.168."
i[65] = " .jp"
i[67] = " .co.jp"
i[69] = " .or.jp"
i[70] = " .ne.jp"
i[71] = " .go.jp"
i[72] = " .ac.jp"
i[73] = " .gr.jp"
i[74] = " .us"
i[75] = " .com"
i[76] = " .org"
i[77] = " .net"
i[78] = " .gov"
i[79] = " .edu"
i[80] = " .mil"

SELECTION ITEM LIST DATA

| CELL ID | c1 | c2 | ... | c16 |
|---|---|---|---|---|
| ITEM (CHARACTER) ID | i1 | i2 | ... | i16 |

CELL ANGLE DATA

| CELL ID | c1 | c2 | ... | c16 |
|---|---|---|---|---|
| ACCEPTABLE ANGLE | 78.75–102.25 | 56.25–78.75 | ... | 101.25–123.75 |

(A)

94a (B)

94a (C)

94a (D)

94a

US 8,780,043 B2

INFORMATION SELECTING APPARATUS, STORAGE MEDIUM STORING INFORMATION SELECTING PROGRAM, GAME APPARATUS, AND STORAGE MEDIUM STORING GAME PROGRAM

CROSS-REFERENCE TO RELATED APPLICATION

The disclosure of Japanese Patent Application No. 2007-55491 is incorporated herein by reference.

TECHNICAL FIELD

The exemplary embodiments described herein relate to an information selecting apparatus, a storage medium storing information selecting program, and a game apparatus and a storage medium storing a game program. More specifically, the exemplary embodiments described herein relate to an information selecting apparatus, a storage medium storing an information selecting program, a game apparatus, and a storage medium storing a game program which allow a user to select an arbitrary item from a plurality of items.

BACKGROUND AND SUMMARY

One example of a character input apparatus for selecting a character set in response to an operation of a direction instructing device is disclosed in Document 1 (Japanese Patent Laying-open No. 2000-10716). In the technique of Document 1, a character set selection line is assigned to a specific direction. In the specific direction, a character set corresponding to an inclined angle of a stick or a load imposed on the stick is selected. The character set is selected by an operation with a determination key to enter a mode in which a character included in the character set is inputtable. In the input mode, a character corresponding to the direction and the angle (or load) of the stick is selected.

In the technique of Document 1, a specific direction is instructed by a circumferential movement of the stick, and a character set is selected by an angle inclined to a radial direction or a load of the stick in the specific direction, and the input mode starts with respect to the character set by an operation of the determination key, and therefore, there is a problem of making a selecting operation of the character set difficult.

Therefore, it is a feature of the present invention to provide a novel information selecting apparatus, a storage medium storing an information selecting program, a game apparatus, and a storage medium storing a game program.

Another feature of the present invention is to provide an information selecting apparatus, a storage medium storing an information selecting program, a game apparatus, and a storage medium storing a game program capable of easily performing a selection operation by a direction input in selecting an item.

The present invention employs following features in order to solve the above-described problems. It should be noted that reference numerals inside the parentheses and supplement shows one example of a corresponding relationship with the exemplary embodiments described later for their easy understanding, and are not intended to be limiting.

A first embodiment is an information selecting apparatus making a user select an arbitrary item from a plurality of items. The information selecting apparatus comprises a direction input means, an operating means, a storing means, a selection item setting means, a selecting means, a sequence input determining means, and a switching means. The direction input means allows an input operation of a direction and inputs direction data indicating a direction in correspondence with an input operation. The operating means inputs operation data in response to a predetermined operation. The storing means stores item data indicative of the plurality of items. The selection item setting means sets the predetermined number of the items out of the item data as a selection item which is brought into correspondence with a predetermined direction. The selecting means selects from the selection item an item corresponding to the direction data from the direction input means, and outputs the item when a predetermined operation data is input. The sequence input determining means determines whether or not a predetermined series of direction input operations is performed on the basis of a shift of the direction data. The switching means switches at least one item out of the selection item to another item of the item data when it is determined that the predetermined series of direction input operations is performed by the sequence input determining means.

In the first embodiment, an information selecting apparatus (10, 12) makes a user select an arbitrary item from a plurality of items. A storing means (22, 50, 220) stores item data indicative of the plurality of items. The item may be a character, a game item, a menu item, etc., for example. In the information selecting apparatus, an item is selected by a direction input of the user. Thus, a direction input means (14, 82a, 94a) is provided, and inputs direction data indicating a direction in correspondence with an input operation by the user. The direction input means may be an analog joystick, a cross key, a touch pad, a mouse, etc., for example. Also, the direction input means may input no direction in a no-operation state. A selection item setting means (46, S1, S101) sets the predetermined number of the items out of the item data as a selection item which is brought into correspondence with an instructed direction by the direction input means. Thus, by inputting a direction corresponding to a desired item out of the selection item, the user can select the item. It should be noted that a total number of items is more than the number of selection items. That is, a part of the entire items is selected as a selection item. Furthermore, in the information selecting apparatus, selecting an item corresponding to the direction by the direction input means is determined or confirmed by another operation. Thus, an operating means (14, 82d, 94b, 86, 88, 96) is provided, and inputs operation data in response to a predetermined operation by the user. The operating means may be a key like a button switch, etc. or an acceleration sensor and an imager for detecting a movement by a user operation, for example. A selecting means (46, S9, S17, S19, S35-S39, S135, S139) selects from the selection item an item corresponding to the direction data, and outputs the item when a predetermined operation data is input. By means of such a direction input means for selecting an item, switching the selection items is performed. That is, a sequence input determining means (46, S23) determines whether or not a predetermined series of direction input operations is performed on the basis of a shift of the direction data. A switching means (46, S29, S31, S129, S131) switches at least one item out of the selection item to another item of the item data when it is determined that the predetermined series of direction input operations is performed. The entire current selection item may be replaced with other selection items, and a part of the current selection item (only one, ⅛, ¼, half, ¾, etc.) may be replaced with other items. It should be noted the item data may be stored so as to be arranged in a predetermined order in a program. In this case, it is at least desirable that the switching means deletes an item arranged at the forefront of the current selection item from the selection item and adds an item arranged next to the current selection item to the selection item (a), or deletes an item arranged last out of the current selection item from the selection item, and adds an item arranged before the current selection item to the selection item (b). Furthermore, typically, when the number of selection items is n pieces, the switching means may delete all the current selection item and take n pieces of items arranged next to the current selection item as a selection item anew (c), or may delete all the current selection item and takes n pieces of items arranged before the current selection item as a selection item anew (d).

Furthermore, the sequence input determining means may determine a first series of input operations and a second series of input operations different therefrom, and execute the above-described (a)(or (c)) processing when it is determined that the first series of input operations is performed, and executes the above-described (b)(or (d)) processing when it is determined that the second series of input operations is performed. Especially, in a case that the sequence input determining means determines the direction input means rotates once as a series of input operations, one clockwise rotation may be determined as a first series of input operations, and one counterclockwise rotation may be determined as a second series of input operations.

In addition, the sequence input determining means may determine that all the direction respectively corresponding to all of the current selection items are input in turn by the direction input means. That is, when the current selection item is item data i1-in, it may be determined that a direction d1 corresponding to it is input, a direction d2 corresponding to i2 is input, then, a direction d3 corresponding to the i3 is input, . . . , a direction dn−1 corresponding to the in−1 is input, and a direction dn corresponding to the in is input. In this case, it is preferable that the input of the direction d1, the input of the direction d2, the input of the direction d3, . . . the input of the direction dn−1, the input of the direction dn are continuously (that is, an input of another direction is not inserted) performed. Especially, in a case that the direction input means inputs no direction in a no-operation state, it may be determined that a continuous input is performed without the no-operation state inserted, but the insertion of the no-operation state may be allowed.

Alternatively, after all the directions respectively corresponding to all the current selection items are input in turn by the direction input means, it is further determined by the sequence input determining means that any direction is input. Typically, after all the directions are input in turn, it may be determined that a direction input at first is further input, and in the above-described example, the input of direction d1, the input of the direction d2, the input of the direction d3, . . . , the input of the direction dn−1, the direction dn, and the input of the direction d1 in this order may be determined.

Furthermore, in a case that the input of the direction d1, the input of the direction d2, the input of the direction d3, . . . , the input of the direction dn−1, and the direction dn in this order are determined, inputs at some midpoint may be allowed to be skipped. That is, when the input of the direction d1, the input of the direction d3, . . . , the input of the direction dn−1, and the direction dn in this order are determined, an affirmative determination may be made.

Furthermore, in a case that all the current selection items are replaced with other items, the number of selection items is n pieces, the n pieces of selection items are regarded as one group, and whereby, respective groups are arranged in a predetermined order and stored in the program. Then, the switching means may select a group arranged next to the current group or a group arranged before the current group.

In addition, in a case that the item data are arranged in a predetermined order and stored in the program, it is preferable that the item data and the direction are brought into correspondence with each other on the basis of the order of the arrangement. Typically, the item data and the direction are brought into correspondence with each other such that the item data is arranged clockwise or counterclockwise in the arrangement order.

Accordingly, the user can select an item from a new selection item in which all or a part of the items are replaced.

According to the first invention, by performing a predetermined series of direction input, a selection item can be switched, allowing an easy switching operation, and improving operability.

A second invention is an information selecting apparatus according to the first invention, and the direction input means includes a stick capable of being inclined, and inputs the direction data in correspondence with an inclined angle of the stick, and the sequence input determining means determines whether or not the stick is rotated once on the basis of the shift of the direction data.

In the second invention, an item is selected in response to a direction input with a stick (94$a$) capable of being inclined. The sequence input determining means determines whether or not the stick is rotated once. Accordingly, the user can switch the selection item with a simple operation like rotating the stick once. In this case, the sequence input determining means may determine one rotation irrespective of the first input direction. For example, in a case that the directions d1, d2, d3, . . . , dn−1, dn are arranged clockwise or counterclockwise in this order in a circle, when an input operation according to a series of input operations from the direction d2, the direction d3 . . . , the direction dn−1, the direction dn, and the direction d1 (to the direction d2) in this order, and a series of input operations from the direction d3, . . . , the direction dn−1, the direction dn, the direction d1, the direction d2 (to the direction d3) in this order are present as well as a series of input operations from the direction d1, the direction d2, the direction d3, . . . the direction dn−1, the direction dn (to the direction d1) in this order, the switching means may switch items.

A third invention is an information selecting apparatus according to the first invention, and the operating means includes a pushable key, and inputs key information in accordance with an operation by the key as the operation data.

In the third invention, when operation data of a predetermined key (82$d$, 94$b$) is input, an item corresponding to the direction data is selected. The user can easily determine or confirm an item selection by a key operation.

Furthermore, both of the direction input means and the pushable key may be provided in a housing capable of being held with a single hand. This allows the user to input with a single hand. In addition, the direction input means is provided in such a position that the thumb is placed when the user holds the housing with a single hand, and the key is provided in such a position that the index finger or the middle finger is placed when the user holds the housing with a single hand, capable of improve operability.

A fourth invention is an information selecting apparatus according to the first invention, and further comprises a display controlling means for displaying on display the selection item set by the selection item setting means and the switching means.

In the fourth invention, the display controlling means (46, 52, S3) displays the set selection item and the switched selection item on the display (30). Since the user can select an item while viewing the displayed selection item, capable of improving operability.

A fifth invention is an information selecting apparatus according to the first invention, and the item is a character or a character string. The fifth invention comprises a character input processing means for processing the character or character string output by the selecting means as an input.

In the fifth invention, a character or a character string are applied as an item. The character input processing means (46, S41, S43) processes the character or character string output by the selecting means as an input. Accordingly, operability of a character selection in the character input can be improved.

A sixth invention is a storage medium storing an information selecting program executed in a computer of an information selecting apparatus having a direction input means allowing an input operation of a direction for inputting direction data indicating a direction in correspondence with an input operation, an operating means for inputting operation data in response to a predetermined operation and a storing means for storing item data indicative of the plurality of items, and allowing a user to select an arbitrary item from the plurality of items. The information selecting program causes the computer to execute a selection item setting step, a selecting step, a sequence input determining step, and a switching step. The selection item setting step sets the predetermined number of the items out of the item data as a selection item which is brought into correspondence with a predetermined direction. The selecting step selects from the selection item an item corresponding to the direction data by the direction input means, and outputs the item when a predetermined operation data is input. The sequence input determining step determines whether or not a predetermined series of direction input operations is performed on the basis of a shift of the direction data. The switching step switches at least one item out of the selection item to another item of the item data when it is determined that the predetermined series of direction input operations is performed by the sequence input determining step.

The sixth invention is storage medium storing an information selecting program corresponding to the information selecting apparatus of the first invention, and has an advantage similar to that in the first invention.

A seventh invention is a game apparatus performing game processing according to an item selected by a user out of a plurality of items. The game apparatus comprises a first operation unit, a second operation unit, an acquiring means, a storing means, a selection item setting means, a selecting means, a sequence input determining means, a switching means, and a game processing means. The first operation unit inputs first operation data in accordance with a predetermined operation. The second operation unit allows a direction input operation and includes at least a direction input means for inputting direction data indicative of a direction in correspondence with the input operation. The acquiring means respectively acquires the first operation data and the direction data from the first operation unit and the second operation unit. The storing means stores item data indicative of the plurality of items. The selection item setting means sets the predetermined number of the items out of the item data as a selection item which is brought into correspondence with a predetermined direction. The selecting means selects from the selection item an item corresponding to the direction data from the direction input means. The sequence input determining means determines whether or not a predetermined series of direction input operations is performed on the basis of a shift of the direction data. The switching means switches at least one item out of the selection item to another item of the item data when it is determined that the predetermined series of direction input operations is performed by the sequence input determining means. The game processing means executes game processing on the basis of the item selected by the selecting means and the first operation data.

In the seventh invention, the game apparatus (10, 12) makes the user select an arbitrary item from a plurality of items similar to the above-described first invention. The game apparatus executes game processing in correspondence with the item selected by the user. The item data indicative of the plurality of items is stored in a storing means (22, 50, 220). The item is a character, a game item, a menu item, etc., for example. The game apparatus includes a first operation unit (34) and a second operation unit (36). A direction input means (94a) for selecting an item is provided to the second operation unit, and inputs direction data indicative of a direction corresponding to an input operation of the direction. Furthermore, the first operation unit inputs first operation data in accordance with a predetermined operation. The first operation data can be utilized for controlling game processing. A selection item setting means (46, S1, S101) sets the predetermined number of the items out of the item data as a selection item which is brought into correspondence with a predetermined direction. Thus, by inputting a direction corresponding to a desired item out of the selection item by means of the second operation unit, the user can select the item. A selecting means (46, S9, S17, S19, S37, S39, S139) selects from the selection item an item corresponding to the direction data. By such a direction input means for selecting an item, switching the selection item is performed. That is, a sequence input determining means (46, S23) determines whether or not a predetermined series of direction input operations is performed on the basis of a shift of the direction data. A switching means (46, S29, S31, S129, S131) switches at least one item out of the selection item to another item of the item data when it is determined that the predetermined series of direction input operations is performed. Thus, the user can select an item from a new selection item in which all or a part of the items are replaced. A game processing means (46, S161) executes game processing on the basis of the selected item of the first operation data.

According to the seventh invention, a predetermined series of direction inputs is performed by means of the direction input means of the second operation unit, and therefore, it is possible to switch the selection item, capable of easily performing the switching operation, and improving operability. Furthermore, by a direction input by the direction input means of the second operation unit, switching and selecting items are performed, and the game processing is executed on the basis of the operation of the first operation unit and the selected item, and therefore, the user can easily select an item with one operation unit, and can easily perform an operation for the game processing in correspondence with the selected item with the other operation unit.

An eighth invention is a game apparatus according to the seventh invention, and the first operation unit includes a movement detecting means for detecting its own movement, the first operation data includes the movement data detected by the movement detecting means, and the game processing means executes game processing on the basis of the item selected by the selecting means and the movement data.

In the eighth invention, the first operation unit is provided with a movement detecting means (86, 88) to which movement data as first operation data is input. The game processing means executes game processing on the basis of the selected item and the movement data. Thus, by a direction input with the second operation unit, switching and selecting items can easily be performed, and by appropriately moving the first operation unit, an operation for the game processing can easily be performed.

A ninth invention is a game apparatus according to the eighth invention, and the first operation unit is provided with an acceleration sensor as the movement detecting means, and the game processing means performs the game processing on the basis of the item selected by the selecting means and the acceleration data acquired by the acceleration sensor.

In the ninth invention, the first operation unit is provided with an acceleration sensor (86), and the movement of the first operation unit is taken by the acceleration. The game processing means performs the game processing on the basis of the selected item and the acceleration data. Thus, by the direction input with the second operation unit, switching and selecting items can easily be performed, and an operation for the game processing can be easily performed according to the movement of the first operation unit.

A tenth invention is a game apparatus according to the eighth invention, and the first operation unit is provided with an imaging device as the movement detecting means, and the game processing means executes the game processing on the basis of the item selected by the selecting means and imaging object data indicative of a position of an imaging object captured by the imaging device.

In the tenth invention, the first operation unit is provided with an imaging device (88). The imaging device images imaging objects (44m, 44n), and inputs imaging object data indicative of positions of the imaging objects as movement data. That is, the movement of the first operation unit is taken in by the position of the imaging objects. The game processing means executes the game processing on the basis of the selected item and the imaging object data. Thus, by a direction input with the second operation unit, switching and selecting items can easily be performed, and an operation for the game processing can easily be performed by the movement of the first operation unit.

An eleventh invention is a storage medium storing a game program to be executed in a computer of the game apparatus having a first operation unit for inputting first operation data in accordance with a predetermined operation, a second operation unit allowing an input operation of a direction and including at least a direction input means for inputting direction data indicative of a direction in correspondence with the input operation, and a storing means for storing item data indicative of a plurality of items, and performing game processing according to an item selected by a user out of the plurality of items. The game program makes the computer execute an acquiring step, a selection item setting step, a selecting step, a sequence input determining step, a switching step, and a game processing step. The acquiring step respectively acquires the first operation data and the direction data from the first operation unit and the second operation unit. The selection item setting step selects the predetermined number of the items out of the item data as a selection item which is brought into correspondence with a predetermined direction. The selecting step selects from the selection item an item corresponding to the direction data from the direction input means. The sequence input determining step determines whether or not a predetermined series of direction input operations is performed on the basis of a shift of the direction data. The switching step switches at least one item out of the selection item to another item of the item data when it is determined that the predetermined series of direction input operations is performed by the sequence input determining step. The game processing step performs game processing on the basis of the item selected by the selecting step and the first operation data.

The eleventh invention is a storage medium storing a game program corresponding to the game apparatus of the seventh invention, and has an advantage similar to that of the seventh invention.

According to the present invention, in accordance with a predetermined series of direction input operations, the selection item is switched, and therefore, a selection operation by a direction input in the item selection can be easily performed.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 15 is an illustrative view showing one example of item data;

DETAILED DESCRIPTION

Figure 1:
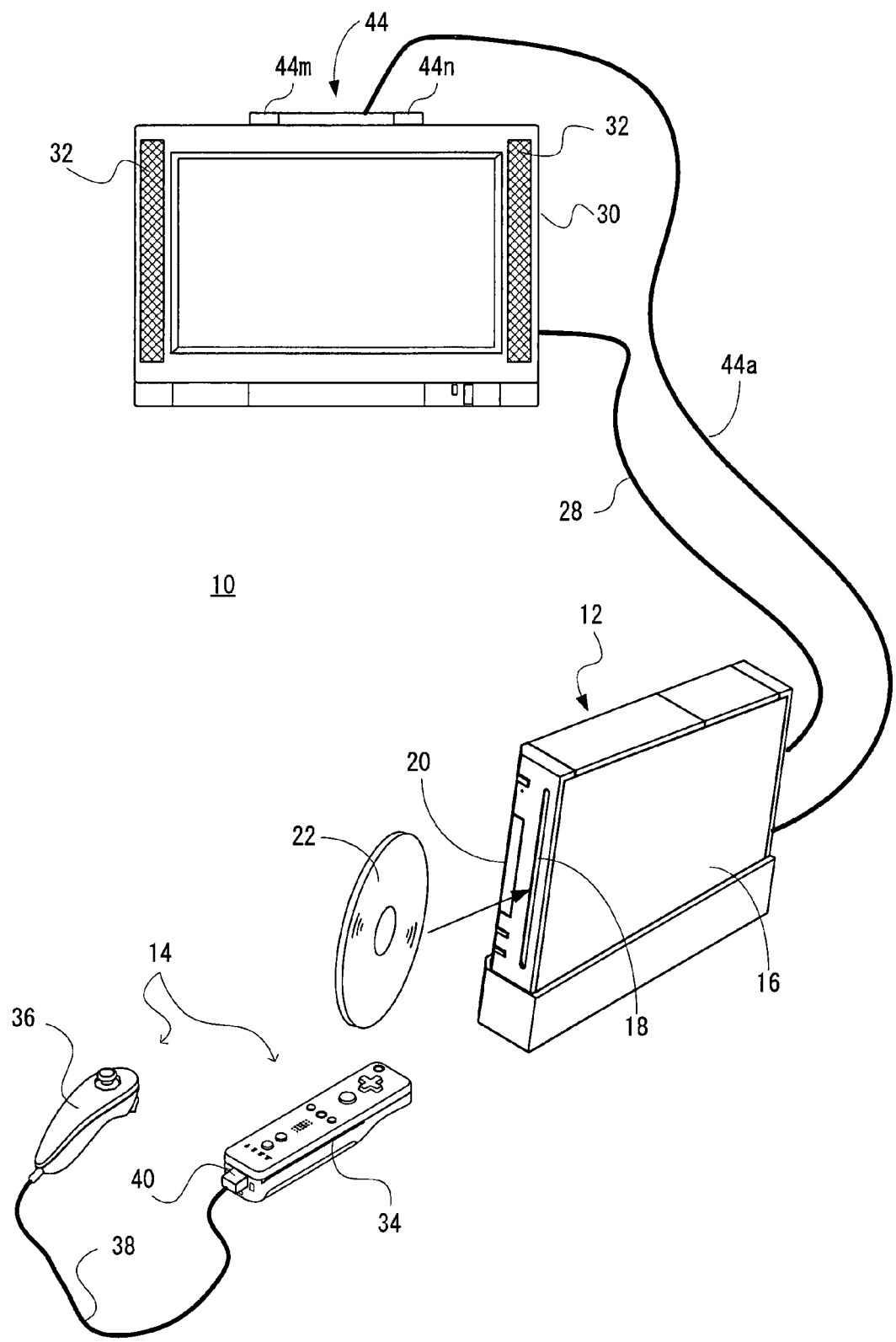
FIG. 1 is an illustrative view showing an appearance of a game system in one embodiment of the present invention.

Referring to FIG. 1, an information selecting apparatus 10 of one embodiment of the present invention is realized in a form of a game system. Additionally, the information selecting apparatus 10 may be realized in a form of a personal computer, a mobile phone, a hand-held terminal, etc. without being limited to the game system.

The information selecting apparatus, that is, the game system 10 includes a game apparatus 12 and a controller 14. The game apparatus 12 is a game console. The controller 14 is an input device or an operating device by a user or a player. The game apparatus 12 and the controller 14 are connected by radio. The wireless communication is executed according to a Bluetooth (registered trademark) standard, for example, but may be executed by other standards such as a wireless LAN.

The game apparatus 12 includes a roughly rectangular parallelepiped housing 16, and the housing 16 is furnished with a disk slot 18 and a memory card slot cover 20 on a front surface. An optical disk 22 as one example of an information storage medium storing game program and data, etc. is inserted from the disk slot 18 to be loaded into a disk drive 24 (see FIG. 2) within the housing 16. Inside the memory card slot cover 20 is provided a memory card slot through which an external memory card 26 (FIG. 2) is inserted. The memory card 26 is employed for loading the game program, etc. read from the optical disk 22 to temporarily store it, storing (saving) game data (result data or proceeding data of the game) of the game played by means of the game system 10, and so forth. It should be noted that storing the game data described above may be performed on an internal memory such as a flash memory in place of the external memory card 26.

The game apparatus 12 has an AV cable connector (not illustrated) on a rear surface of the housing 16, and by means of the connector, the game apparatus 12 is connected to a monitor (display) 30 via an AV cable 28. The monitor 30 is typically a color television receiver, and through the AV cable 28, a video signal from the game apparatus 12 is input to a video input terminal of the color television, and a sound signal is input to a sound input terminal thereof. Accordingly, a game image of a three-dimensional (3D) video game, for example, is displayed on the screen of the color television (monitor) 30, and a stereo game sound, such as a game music, a sound effect is output from integrated speakers 32.

Furthermore, the power of the game apparatus 12 is applied by means of a general AC adapter (not illustrated). The AC adapter is inserted into a standard wall socket for home use, and transforms the house current to a low DC voltage signal suitable for driving the game apparatus 12. In another embodiment, a battery may be utilized as a power supply.

The controller 14, which is described in detail later, includes a first controller 34 and a second controller 36 each capable of being held with one hand as a first operation unit and a second operation unit, respectively. A cable 38 has one end extending from the rear end of the second controller 36 and the other end provided with a connector 40. The connector 40 is connected to a connector 42 (FIG. 3, FIG. 5) provided on a rear end surface of the first controller 34. Input data obtained by the second controller 36 is applied to the first controller 34 through the cable 38. The first controller 34 transmits controller data including the input data of the first controller 34 itself and the input data of the second controller 36.

In the game system 10, a user turns the power of the game apparatus 12 on for playing the game (or other applications), then selects an appropriate optical disk 22 storing a video game (or other applications the player wants to play), and loads the optical disk 22 into the disk drive 24 through the disk slot 18 of the game apparatus 12. In response thereto, the game apparatus 12 starts to execute a video game or other applications on the basis of the software stored in the optical disk 22. The user operates the controller 14 in order to apply an input to the game apparatus 12.

Additionally, around the monitor 30 (upper side in this embodiment), a sensor bar 44 is provided, and the sensor bar 44 is provided with two LED modules (hereinafter referred to as "marker") 44m and 44n at a predetermined interval. By utilizing the sensor bar 44, as described later, the controller 14 (first controller 34) functions as a pointing device for pointing a position on the screen. Each of the markers 44m and 44n is an infrared LED, and outputs infrared light toward the front of the monitor 30. A cable 44a extending from the sensor bar 44 is connected to a connector (not illustrated) on a rear surface of the game apparatus 12, and a power is supplied to the markers 44m and 44n from the game apparatus 12.

Figure 2:
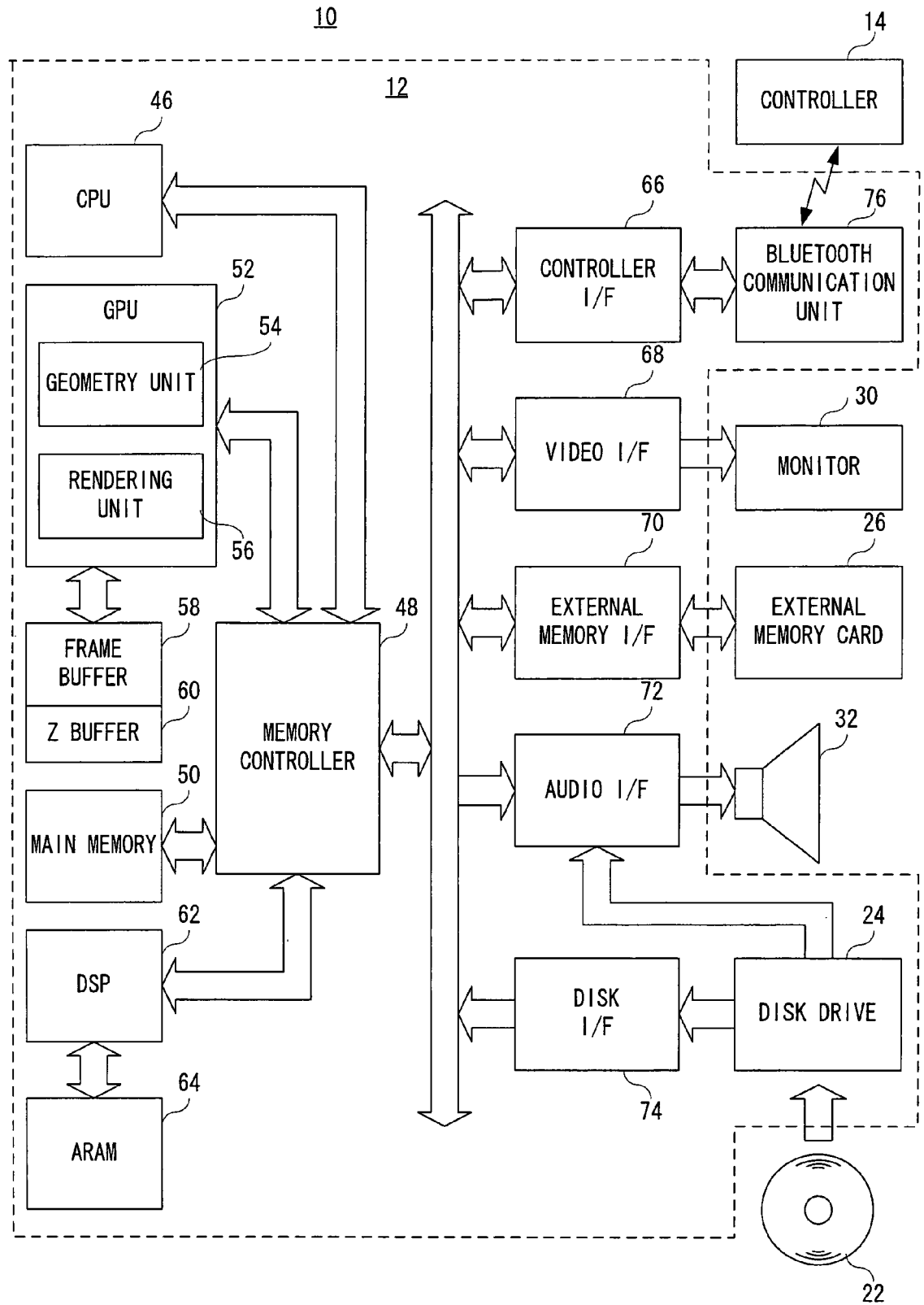
FIG. 2 is a block diagram showing one example of an electric configuration of the game system.

FIG. 2 is a block diagram showing an electric configuration of the game system 10. The game apparatus 12 includes a CPU 46. The CPU 46 functions as a game processor, and is a computer for overall controlling the game apparatus 12. The CPU 46 is connected with a memory controller 48 via a bus. The memory controller 48 mainly controls writing and reading of a main memory 50 connected via a bus under the control of the CPU 46. The memory controller 48 is connected with a GPU (Graphics Processing Unit) 52.

The GPU 52 forms a part of a rendering means, and is constituted by a single chip ASIC, for example, receives a graphics command (rendering instruction) from the CPU 46 via the memory controller 48, and by following the command thus received, generates a 3D game image by a geometry unit 54 and a rendering unit 56. Namely, the geometry unit 54 performs coordinates arithmetic processing of rotation, movement, and deformation, etc. of each kind of object of a three dimensional coordinate system. The object is formed of a plurality of polygons (the polygon here refers to a polygonal plane defined by at least three vertexes coordinates.) The rendering unit 56 performs image generation processing such as attaching a texture (texture image) to each polygon of each kind of object, and so forth. Accordingly, 3D image data to be displayed on the game screen is generated by the GPU 52, and the image data is stored in a frame buffer 58.

Note that necessary data (primitive or polygon and texture, etc) required to execute the graphics command by the GPU 52 is obtained from the main memory 50 via the memory controller 48 by the GPU 52.

The frame buffer 58 is a memory for drawing (accumulating) one frame of image data of a raster scan monitor 30, for example, and is overwritten for every frame by the GPU 52. Specifically, the frame buffer 58 sequentially stores chromatic information of an image for each pixel. Here, the chromatic information refers to data on R, G, B and A, and corresponds to R (red) data of 8 bits, G (green) data of 8 bits, B (blue) data of 8 bits, and A (alpha) data of 8 bits, for example. Note that A data is the data on a mask (mat image). Additionally, a video I/F 68 to be described later reads the data in the frame buffer 58 via the memory controller 48 to thereby display a game image on the monitor 30.

In addition, a Z buffer 60 has a storage capacity equivalent to (the number of pixels corresponding to the frame buffer 58×the number of bits of the depth data per one pixel), and stores depth information or depth data (Z value) of dots corresponding to each storage location of the frame buffer 58.

Both of the frame buffer 58 and the Z buffer 60 may be constituted by using one portion of the main memory 50, and also these buffers may be provided inside the GPU 52.

The memory controller 48 is furthermore connected to a RAM for audio (referred to as "ARAM" hereafter) 64 via a DSP (Digital Signal Processor) 62. Accordingly, the memory controller 48 controls writing and/or reading of the ARAM 64 as a sub-memory as well as that of the main memory 50.

The DSP 62 works as a sound processor, and generates audio data corresponding to sound, voice or music necessary for the game, by using sound data stored in the main memory 50 and by using sound wave (tone) data written in the ARAM 64.

The memory controller 48 is further connected to respective interfaces (I/F) 64, 66, 68, 70, 72, and 74 by the bus. The controller I/F 66 is an interface for the controller 14 connected to the game apparatus 12 via a Bluetooth communication unit 76. More specifically, the Bluetooth communication unit 76 is a communication device for the main body, and receives controller data (input data) sent from a radio module 78 (FIG. 5), that is, a communication device of the controller 14. The controller I/F 66 applies the controller data received through the Bluetooth communication unit 76 to the CPU 46 through the memory controller 48. The video I/F 68 accesses the frame buffer 58 to read the image data generated by the GPU 52, and applies the image signal or the image data (digital RGBA pixel value) to the monitor 30 via the AV cable 28 (FIG. 1).

The external memory I/F 70 associates the external memory card 26 to be inserted into the front surface of the game apparatus 12 with the memory controller 48. Whereby, the CPU 46 can write the data into the memory card 26, or can read out the data from the memory card 26, via the memory controller 48. The audio I/F 72 receives audio data given from the DSP 62 or an audio stream read from the optical disk 22, through the memory controller 48, and gives audio signals (sound signal) corresponding thereto to the speakers 32 of the monitor 30.

The disk I/F 74 connects the disk drive 24 to the memory controller 48 to thereby allow the CPU 46 to control the disk drive 24. The program and data read out from the optical disk 22 by this disk drive 24 are written into the main memory 50 under the control of the CPU 46. The CPU 46 executes a process for the game or the application according to this program.

Figure 3:
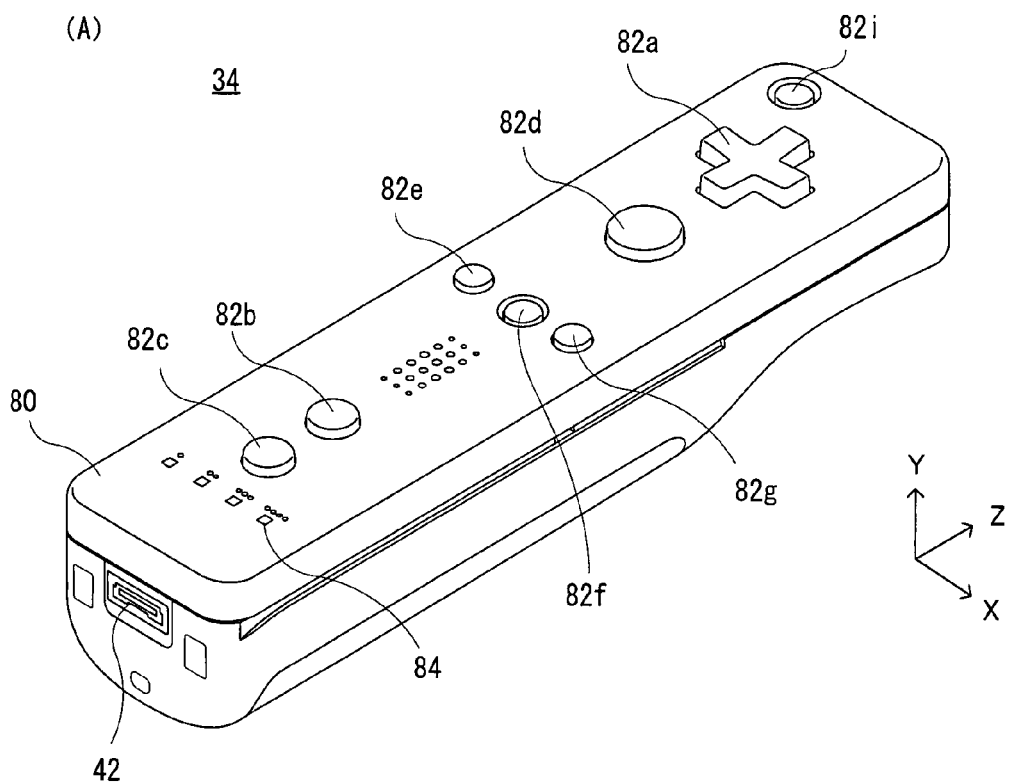
FIG. 3 is an illustrative view showing one example of an appearance of a first controller, FIG. 3 (A) is a perspective view of the first controller as seeing it from above rear, and FIG. 3 (B) is a perspective view of the first controller as seeing it from below front.
Figure 3:
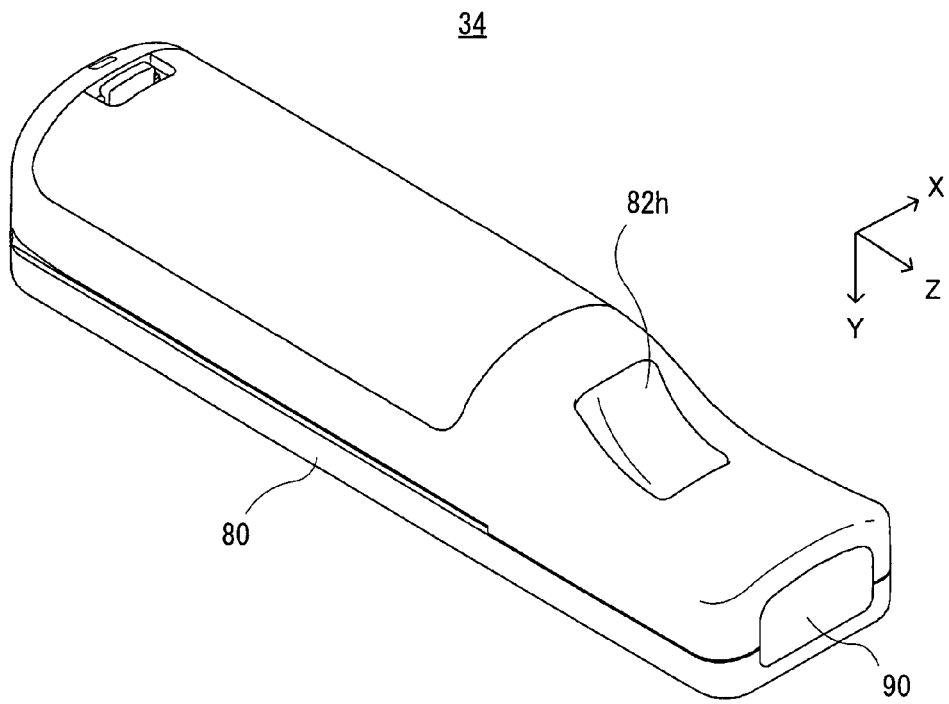

FIG. 3 shows one example of an external appearance of the first controller 34. FIG. 3 (A) is a perspective view of the first controller 34 as seeing it from above rear, and FIG. 3 (B) is a perspective view of the first controller 34 as seeing it from below front.

The first controller 34 has a housing 80 formed by plastic molding, for example. The housing 80 is formed into an approximately rectangular parallelepiped shape regarding a back and forth direction (Z-axis direction shown in FIG. 3) as a longitudinal direction, and has a size small enough to be held by one hand of a child and an adult. As one example, the housing 80 has a length or a width approximately the same as that of the palm of the person. A player can perform a game operation by means of the first controller 34, that is, by pushing buttons provided on it and by changing a position and a direction of the first controller 34 itself.

The housing 80 is provided with a plurality of operation buttons (operation key). That is, on the top surface of the housing 80, a cross key 82a, a 1 button 82b, a 2 button 82c, an A button 82d, a − button 82e, a menu button 82f, and a + button 82g are provided. Meanwhile, on the bottom surface of the housing 80, a concave portion is formed, and on the reward inclined surface of the concave portion, a B button 82h is provided. Each of the buttons (switches) 82a-82h is assigned an appropriate function according to a game program to be executed by the game apparatus 12. Furthermore, the housing 80 has a power switch 82i for turning on/off the power of the main body of the game apparatus 12 from a remote place on a top surface. The respective buttons (switches) provided on the first controller 34 may inclusively be indicated with the use of the reference numeral 82.

At the back surface of the housing 80, the above-described connector 42 is provided. The connector 42 is a 32 pin edge connector, for example, and utilized for connecting other devices to the first controller 34. In this embodiment, the connector 42 is connected with the connector 40 of the second controller 36. At the back end of the top surface of the housing 80, a plurality of LEDs 84 are provided, and the plurality of LEDs 84 show a controller number (identification number of the controller) of the controller 14. The game apparatus 12 can be connected with a maximum four controllers 14, for example. If a plurality of controllers 14 are connected to the game apparatus 12, a controller number is applied to the respective controllers 14 in the order connected, for example. Each LED 84 corresponds to a controller number, and the LED 84 corresponding to the controller number lights up.

Furthermore, inside the housing 80 of the first controller 34, an acceleration sensor 86 (FIG. 5) is provided. As an acceleration sensor 86, acceleration sensors of an electrostatic capacity type can typically be utilized. The acceleration sensor 86 detects accelerations of a linear component for each sensing axis and gravitational acceleration out of the accelerations applied to a detection portion of the acceleration sensor. More specifically, in this embodiment, a three-axis acceleration sensor is applied to detect the respective accelerations in directions of three axes of a up and down direction (Y-axial direction shown in FIG. 3), a right and left direction (X-axial direction shown in FIG. 3), and a forward and rearward direction (Z-axial direction shown in FIG. 3) of the first controller 34.

It should be noted that as an acceleration sensor 86, two-axis acceleration sensors may be utilized for detecting any two of the directions of the accelerations out of the up and down direction, the right and left direction and the back and forth direction according to the shape of the housing 80, the limitation on how to hold the first controller 34, or the like. Under certain circumstances, a one-axis acceleration sensor may be used.

Figure 5:
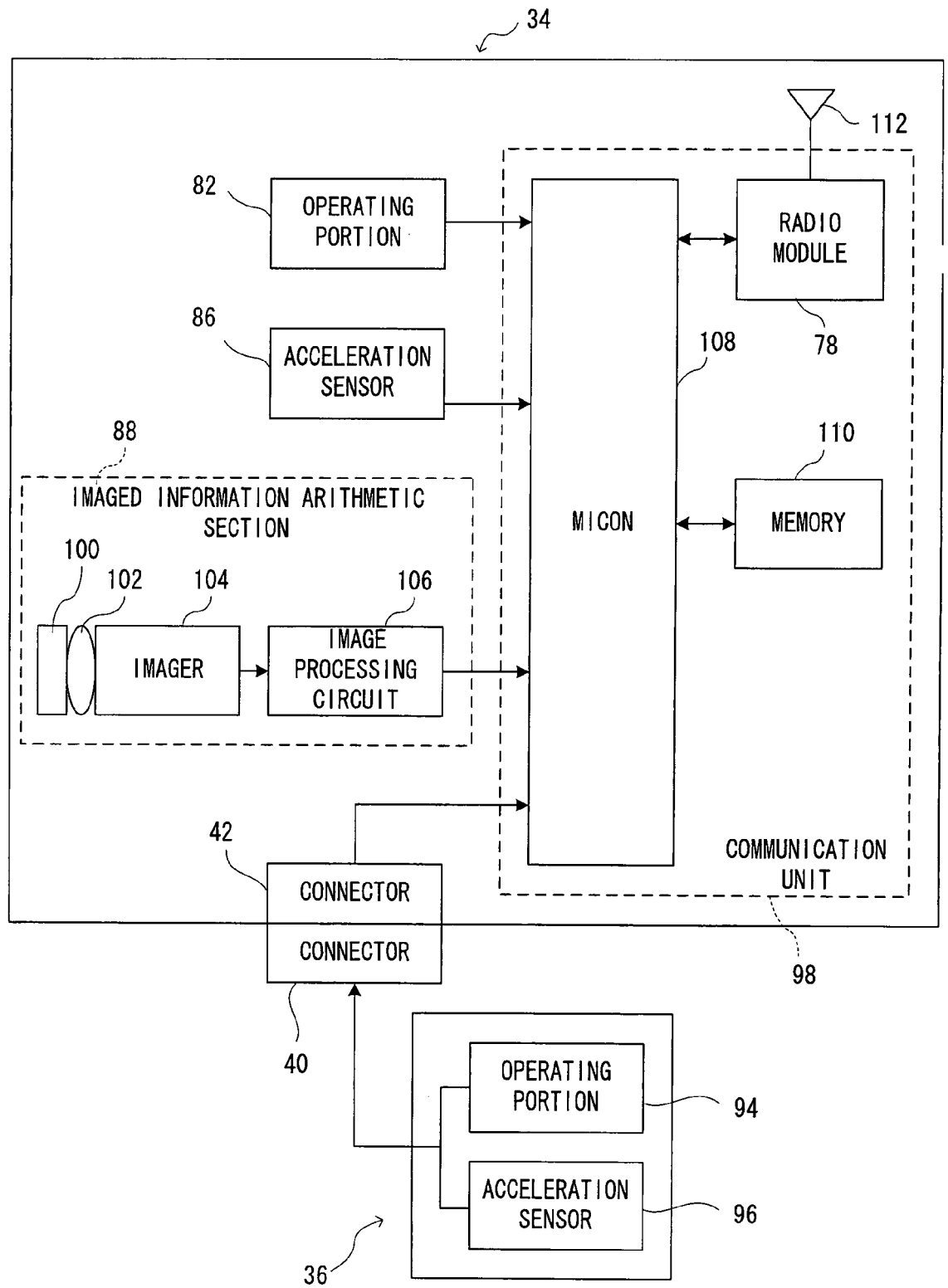
FIG. 5 is a block diagram showing one example of an electric configuration of a controller.

In addition, the first controller 34 has an imaged information arithmetic section 88 (see FIG. 5). As shown in FIG. 3 (B), on the front end surface of the housing 80, a light incident opening 90 of the imaged information arithmetic section 88 is provided, and from the light incident opening 90, infrared rays emitted by the markers 44m and 44n of the sensor bar 44 are captured.

Figure 4:
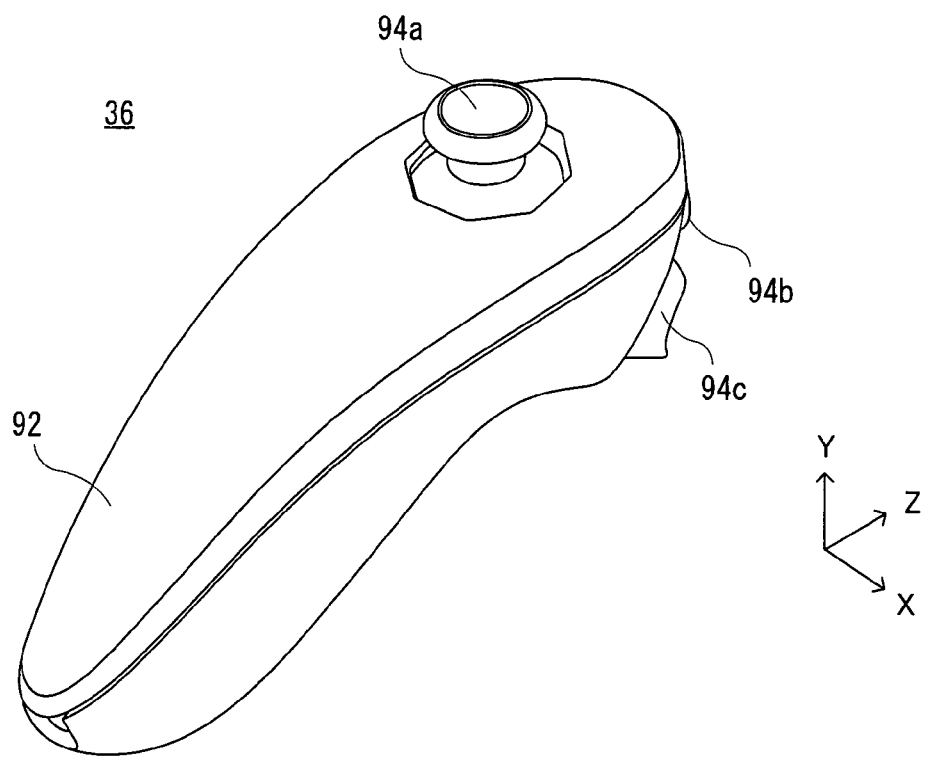
FIG. 4 an illustrative view showing one example of an appearance of a second controller, FIG. 4 (A) is a perspective view of the second controller as seeing it from above rear, and FIG. 4 (B) is a perspective view of the second controller as seeing it from below front.
Figure 4:
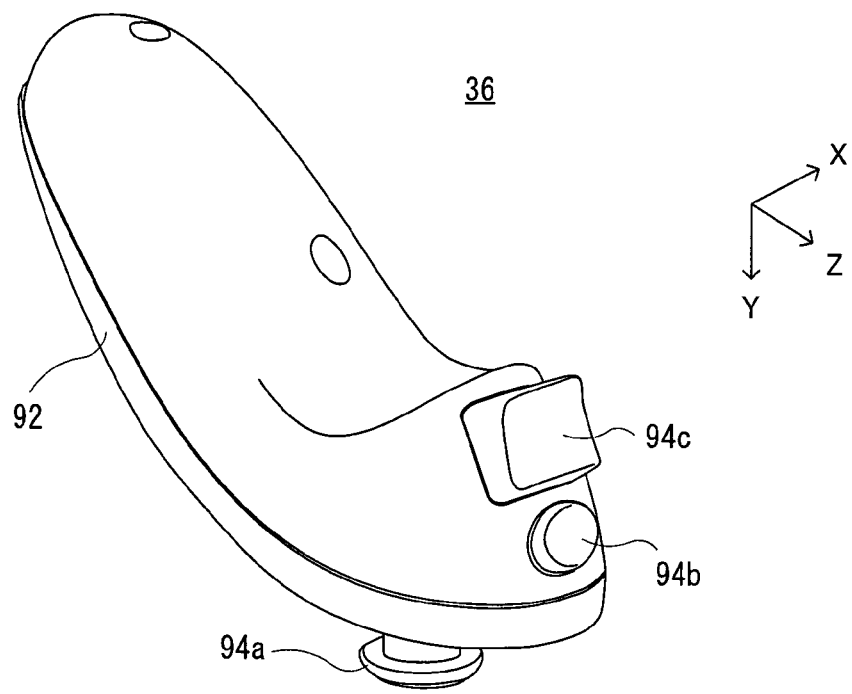

FIG. 4 shows one example of an appearance of the second controller 36. FIG. 4 (A) is a perspective view of the second controller 36 as seeing it from above rear, and FIG. 4 (B) is a perspective view of the second controller 36 as seeing it from below front. Additionally, in FIG. 4, the cable 38 of the second controller 36 is omitted.

The second controller 36 has a housing 92 formed by plastic molding, for example. The housing 92 is formed into an approximately thin long elliptical shape in the forward and backward directions (Z-axis direction in FIG. 4) when viewed from plane, and the width of the right and left direction (X-axis direction in FIG. 4) at the back end is narrower than that of the front end. Furthermore, the housing 92 has a curved shape as a whole when viewed from a side, and downwardly curved from a horizontal portion at the front end to the back end. The housing 92 has a size small enough to be held by one hand of a child and an adult similar to the first controller 34 as a whole, and has a longitudinal length (in the Z-axis direction) slightly shorter than that of the housing 80 of the first controller 34. Even with the second controller 36, the player can perform a game operation by operating buttons and a stick, and by changing a position and a direction of the controller by moving itself.

At the end of the top surface of the housing 92, an analog joystick 94a is provided. At the end of the housing 92, a front edge slightly inclined backward is provided, and on the front edge are provided a C button 94b and a Z button 94c vertically arranged (Y-axis direction in FIG. 4). The analog joystick 94a and the respective buttons 94b and 94c are assigned appropriate functions according to a game program to be executed by the game apparatus 12. The analog joystick 94a and the respective buttons 94b and 94c provided to the second controller 36 may be inclusively denoted by means of the reference numeral 94.

Inside the housing 92 of the second controller 36, an acceleration sensor 96 (FIG. 5) is provided. As the acceleration sensor 96, an acceleration sensor similar to the acceleration sensor 86 in the first controller 34 is applied. More specifically, the three-axis acceleration sensor is applied in this embodiment, and detects accelerations in the respective three axis directions like an up and down direction (Y-axial direction shown in FIG. 4), a right and left direction (X-axial direction shown in FIG. 4), and a forward and backward direction (Z-axial direction shown in FIG. 4) of the second controller 36.

Additionally, the shapes of the first controller 34 shown in FIG. 3 and the second controller 36 shown in FIG. 4 and the shape, the number and the setting position of the buttons (switches, stick, or the like), etc. are merely one example, and can be changed to other shapes, numbers and setting positions, etc. as needed.

Furthermore, the controller 14 is powered by a battery (not illustrated) detachably incorporated in the first controller 34. The second controller 36 is powered through the connector 42, the connector 40, and the cable 38.

FIG. 5 shows one example of an electric configuration of the controller 14 when the first controller 34 and the second controller 36 are connected with each other.

The first controller 34 incorporates a communication unit 98, and the communication unit 98 is connected with the operating portion 82, the acceleration sensor 86, the imaged information arithmetic section 88 and the connector 42. The operating portion 82 indicates the above-described operation buttons or operating switches 82a-82i. When the operating portion 82 is operated, an operation signal (key information) is applied to the communication unit 98.

The data indicative of acceleration detected by the acceleration sensor 86 is output to the communication unit 98. The acceleration sensor 86 has in the order of a maximum sampling period of 200 frames per second.

The data taken in by the imaged information arithmetic section 88 is also output to the communication unit 98. The imaged information arithmetic section 88 is constituted by an infrared filter 100, a lens 102, an imager 104 and an image processing circuit 106. The infrared filter 100 passes only infrared rays from the light incident from the light incident opening 90 at the front of the first controller 34. As described above, the markers 44m and 44n of the sensor bar 44 placed near (around) the display screen of the monitor 30 are infrared LEDs for outputting infrared lights forward the monitor 30. Accordingly, by providing the infrared filter 100, it is possible to image the image of the markers 44m and 44n more accurately. The lens 102 condenses the infrared rays passing thorough the infrared filter 100 to emit them to the imager 104. The imager 104 is a solid imager, such as a CMOS sensor and a CCD, for example, and images the infrared rays condensed by the lens 102. Accordingly, the imager 104 images only the infrared rays passing through the infrared filter 100 to generate image data. Hereafter, the image imaged by the imager 104 is called an "imaged image". The image data generated by the imager 104 is processed by the image processing circuit 106. The image processing circuit 106 calculates positions of objects to be imaged (markers 44m and 44n) within the imaged image, and outputs marker coordinates data including each coordinate value indicative of the position to the communication unit 98 for each predetermined time (one frame, for example). It should be noted that a description of the image processing circuit 106 is made later.

The connector 42 is connected with the connector 40 of the cable 38 extending from the second controller 36. The connector 40 is connected with the operating portion 94 and the acceleration sensor 96 of the second controller 36. The operating portion 94 denotes the above-described analog joystick 94a and operation buttons 94b and 94c. When the operating portion 94 is operated, an operation signal is applied to the communication unit 98 via the cable 38, the connector 40, the connector 42, etc. The acceleration sensor 96 also has a sampling period similar to that of the acceleration sensor 86, and applies the data indicative of the detected acceleration to the communication unit 98.

The communication unit 98 includes a microcomputer (micon) 108, a memory 110, a radio module 78 and an antenna 112. The micon 108 transmits the obtained data to the game apparatus 12 and receives data from the game apparatus 12 by controlling the radio module 78 while using the memory 110 as a memory area (working area and buffer area) in processing.

The data output from the operating portion 82, the acceleration sensor 86 and the imaged information arithmetic section 88 of the first controller 34, and the operating portion 94 and acceleration sensor 96 of the second controller 36 to the micon 108 is temporarily stored in the memory 110. The radio transmission from the communication unit 98 to the Bluetooth communication unit 76 of the game apparatus 12 is performed every predetermined cycle. The game processing is generally performed by regarding 1/60 seconds as a unit, and therefore, it is necessary to perform the transmission from the first controller 34 at a cycle equal to or shorter than it. The micon 108 outputs data including the operation data of the operating portions 82 and 94 and the acceleration data of the acceleration sensors 86 and 96, and marker coordinates data from the imaged information arithmetic section 88 stored in the memory 110 to the radio module 78 as controller data when transmission timing to the game apparatus 12 has come. The radio module 78 modulates a carrier of a predetermined frequency by the controller data, and emits its weak radio wave signal from the antenna 112 by using a short-range wireless communication technique, such as Bluetooth (trademarks). Namely, the controller data is modulated to the weak radio wave signal by the radio module 78 and transmitted from the first controller 34. The weak radio wave signal is received by the Bluetooth communication unit 76 of the game apparatus 12. The weak radio wave thus received is subjected to demodulating and decoding processing, thus making it possible for the game apparatus 12 to obtain the controller data. The CPU 46 of the game apparatus 12 performs the game processing on the basis of the controller data obtained from the controller 14.

It will be appreciated by those skilled in the art from the description of this specification that a computer, such as a processor (CPU 46, for example) of the game apparatus 12 or the processor (micon 108, for example) of the controller 14 executes processing on the basis of an acceleration signal output from the acceleration sensors 86 and 96, and whereby, more information relating to the controller 14 can be estimated or calculated (determined). In a case that processing is executed on the side of the computer assuming that the first controller 34 and second controller 36 respectively incorporated with the acceleration sensors 86 and 96 are in a static state (that is, processing is executed considering that accelerations detected by the acceleration sensors 86 and 96 are only gravitational accelerations), if the first controller 34 and the second controller 36 are actually in a static state, it is possible to know whether or not the orientations of the first controller 34 and the second controller 36 are inclined with respect to the direction of gravity or to what extent they are inclined on the basis of the detected acceleration. More specifically, when a state in which the detection axes of the acceleration sensors 86 and 96 are directed to a vertically downward direction is taken as a reference, merely whether or not 1G (gravitational acceleration) is imposed on can show whether or not each of the first controller 34 and the second controller 36 is inclined, and the size can show to what extent each of them is inclined. Furthermore, if a multi-axes acceleration sensor is applied, by further performing processing on an acceleration signal of each axis, it is possible to more precisely know to what extent the first controller 34 and the second controller 36 is inclined with respect to the direction of gravity. In this case, on the basis of outputs from the acceleration sensors 86 and 96, the computer may perform processing of calculating data of inclined angles of the first controller 34 and second controller 36, but perform processing of estimating an approximate inclination on the basis of the outputs from the acceleration sensors 86 and 96 without performing the processing of calculating the data of the inclined angle. Thus, by using the acceleration sensors 86 and 96 in conjunction with the computer, it is possible to determine an inclination, an orientation or a position of each of the first controller 34 and second controller 36.

On the other hand, assuming that the acceleration sensors 86 and 96 are in a dynamic state, accelerations according to the movement of the acceleration sensors 86 and 96 are detected in addition to the gravitational acceleration component, and therefore, if the gravitational acceleration component is removed by predetermined processing, it is possible to know a moving direction, etc. More specifically, in a case that the first controller 34 and the second controller 36 respectively being furnished with the acceleration sensors 86 and 96 are accelerated and moved by the hands of the user, acceleration signals generated by the acceleration sensors 86 and 96 are processed by the above-described computer, and whereby, it is possible to calculate various movements and/or positions of the first controller 34 and the second controller 36. Additionally, even when assuming that the acceleration sensors 86 and 96 are in a dynamic state, if an acceleration in correspondence with the movement of each of the acceleration sensors 86 and 96 is removed by the predetermined processing, it is possible to know the inclination with respect to the direction of gravity. In another embodiment, each of the acceleration sensors 86 and 96 may contain a built-in signal processing apparatus or other kinds of dedicated processing apparatuses for performing desired processing on the acceleration signal output from the incorporated acceleration detecting means before outputting the signal to the micon 108. For example, in a case that the acceleration sensors 86 and 96 are ones for detecting a static acceleration (gravitational acceleration, for example), the built-in or dedicated processing apparatuses may be ones for transforming the detected acceleration signal into the inclined angle (or other preferable parameters) corresponding thereto.

Figure 6:
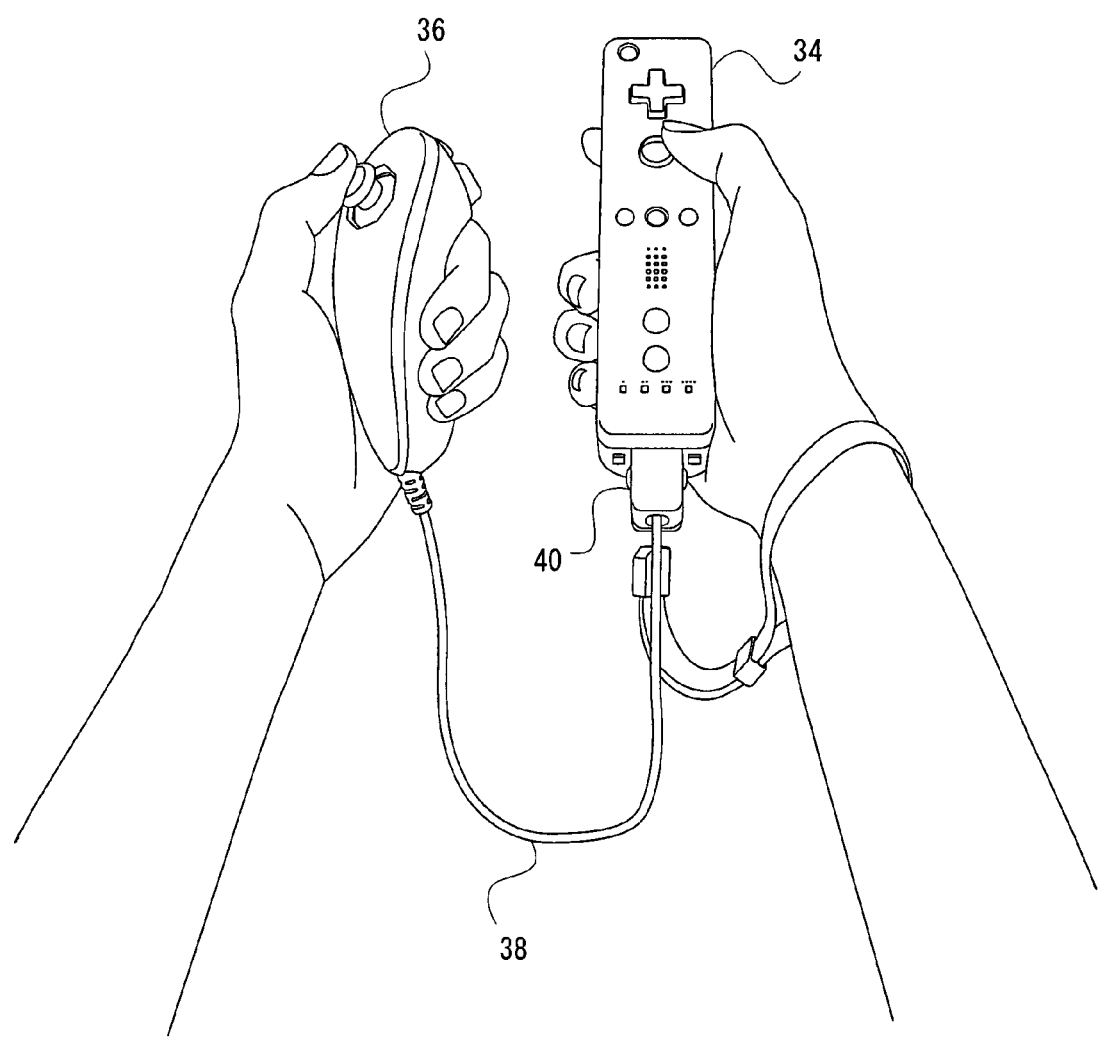
FIG. 6 is an illustrative view showing a first controller and a second controller respectively held with a right hand and a left hand of a user.

In this game system 10, a user can make an operation or input to the game by moving the controller 14. In playing the game, for example, the user holds the first controller 34 with the right hand and the second controller 36 with the left hand as shown in FIG. 6. As described above, in this embodiment, the first controller 34 is incorporated with the acceleration sensor 86 for detecting accelerations in the three-axis directions, and the second controller 36 is also incorporated with the same acceleration sensor 96. When the first controller 34 and the second controller 36 are moved by the user, acceleration values respectively indicating the movements of the controllers are detected by the acceleration sensor 86 and the acceleration sensor 96. In the game apparatus 12, game processing can be executed according to the detected acceleration values.

Furthermore, the first controller 34 is provided with the imaged information arithmetic section 88, and this makes it possible for the user to utilize the first controller 34 as a pointing device. In this case, the user holds the first controller 34 with the edge surface (light incident opening 90) of the first controller 34 directed to the markers 44*m* and 44*n*. It should be noted that as understood from FIG. 1, the markers 44*m* and 44*n* are placed around a predetermined side (top or bottom) of the monitor 30 in parallel with a predetermined side. In this state, the user can perform a game operation by changing a position on the screen instructed with the first controller 34 by moving the first controller 34 itself, and by changing distances between the first controller 34 and each of the markers 44*m* and 44*n*.

Figure 7:
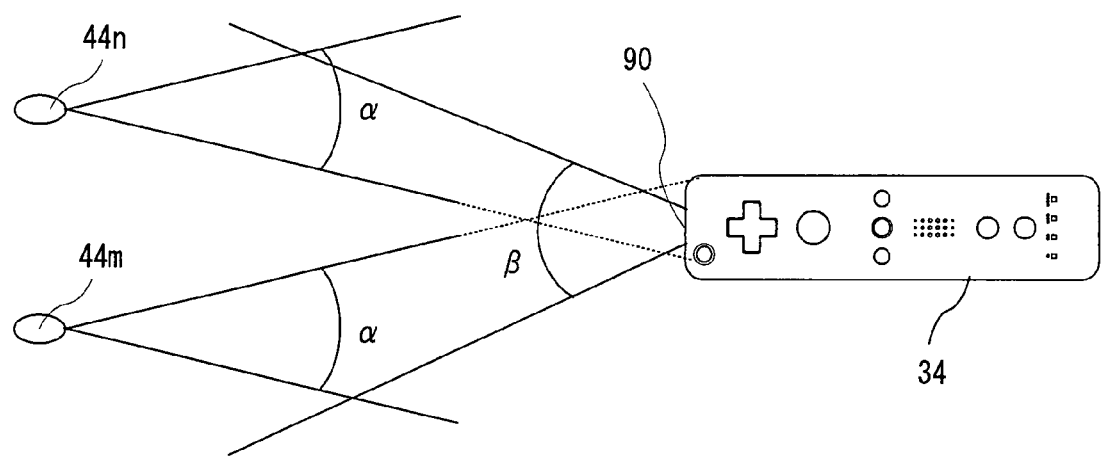
FIG. 7 is an illustrative view explaining a viewing angle of the marker and the first controller shown in FIG. 1.

FIG. 7 is a view explaining viewing angles between the respective markers 44*m* and 44*n*, and the first controller 34. As shown in FIG. 7, each of the markers 44*m* and 44*n* emits infrared ray within a range of a viewing angle $\alpha$. Also, the imager 104 of the imaged information arithmetic section 88 can receive incident light within the range of the viewing angle $\beta$ taking the line of sight of the first controller 34 (Z axis direction in FIG. 3) as a center. For example, the viewing angle $\alpha$ of each of the markers 44*m* and 44*n* is 34° (half-value angle) while the viewing angle $\beta$ of the imager 104 is 42°. The user holds the first controller 34 such that the imager 104 is directed and positioned so as to receive the infrared rays from the markers 44*m* and 44*n*. More specifically, the user holds the first controller 34 such that at least one of the markers 44*m* and 44*n* exists in the viewing angle $\beta$ of the imager 104, and the first controller 34 exists in at least one of the viewing angles α of the marker 44m or 44n. In this state, the first controller 34 can detect at least one of the markers 44m and 44n. The user can perform a game operation by changing the position and the orientation of the first controller 34 in the range satisfying the state. Also, in a case that any one of the makers 44m and 44n is only detected, by setting temporary marker coordinates in place of the other marker which is not detected by means of data detecting the previous two makers 44m and 44n, an instructed position by the first controller 34 can be calculated.

If the position and the orientation of the first controller 34 are out of the range, the game operation based on the position and the orientation of the first controller 34 cannot be performed. Hereafter, the above-described range is called an "operable range."

Figure 8:
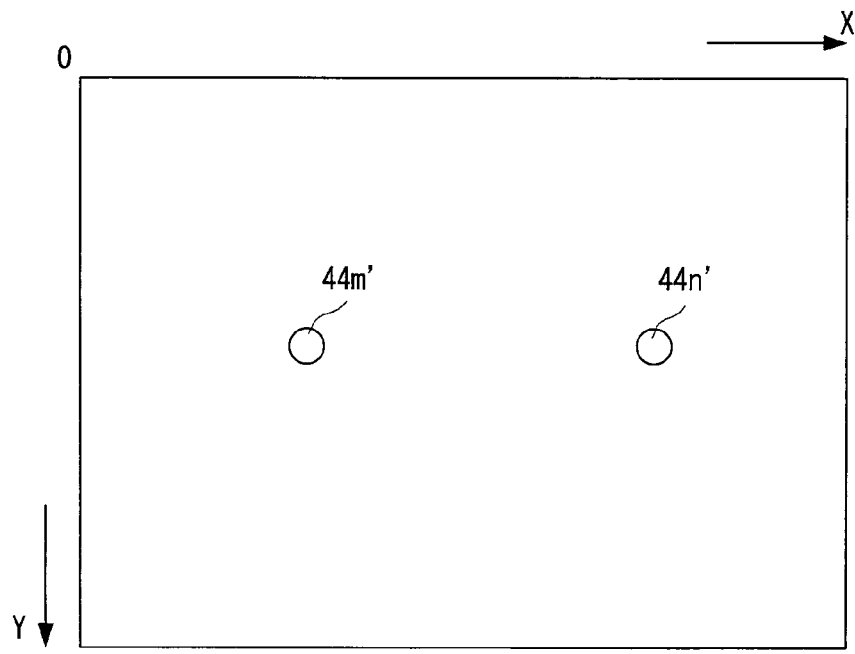
FIG. 8 is an illustrative view showing one example of an imaged image including an object image.

If the first controller 34 is held within the operable range, an image of each of the markers 44m and 44n is imaged by the imaged information arithmetic section 88. That is, the imaged image obtained by the imager 104 includes an image (object image) of each of the markers 44m and 44n as an object to be imaged. FIG. 8 is a view showing one example of the imaged image including an object image. The image processing circuit 106 calculates coordinates (marker coordinates) indicative of the position of each of the markers 44m and 44n in the imaged image by utilizing the image data of the imaged image including the object images 44m' and 44n'.

Since the object images 44m' and 44n' appear as a high-intensity part in the image data of the imaged image, the image processing circuit 106 first detects the high-intensity part as a candidate of the object image. Next, the image processing circuit 106 determines whether or not the high-intensity part is an object image on the basis of the size of the detected high-intensity part. The imaged image may include images other than the object image due to sunlight through a window and light of a fluorescent lamp in the room as well as the two object images 44m' and 44n'(marker images). The determination processing whether or not the high-intensity part is an object image is executed for discriminating the images 44m' and 44n' of the two markers 44m and 44n as an object image from the images other than them, and accurately detecting the object image. In order to discriminate the object images 44m' and 44n' in the imaged image from other images, the imaging objects 44m and 44n are necessary to be known, and in this embodiment, the size is decided in advance, and therefore, it is possible to estimate the size of the marker images 44m' and 44n'. Thus, on the basis of the size of the high-intensity part, it is possible to make a determination of the marker images 44m' and 44n'. More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 106 calculates the position of the high-intensity part. More specifically, the barycenter position of the high-intensity part is calculated. Here, the coordinates of the barycenter position is called a "marker coordinates". Also, the barycenter position can be calculated with more detailed scale than the resolution of the imager 104. Now, the resolution of the imaged image imaged by the imager 104 shall be 126×96, and the barycenter position shall be calculated with the scale of 1024×768. That is, the marker coordinates is represented by the integer from (0, 0) to (1024, 768).

Additionally, as shown in FIG. 8, the positions in the imaged image are represented in a coordinate system (X-Y coordinate system of the imaged image) by taking the upper left of the imaged image as an original point O, the downward direction as the Y-axis positive direction, and the right direction as the X-axis positive direction.

Furthermore, in a case that the object images 44m' and 44n' are accurately detected, two high-intensity parts are determined as an object image by the determination processing, and therefore, it is possible to calculate two marker coordinates. The image processing circuit 106 outputs data indicative of the calculated two marker coordinates, that is, imaging object data indicative of positions of the imaging objects to the communication unit 98. The output imaging object data (marker coordinate data) is included in the controller data by the micon 108 as described above, and transmitted to the game apparatus 12.

When taking in the marker coordinate data from the received controller data, the game apparatus 12 (CPU 46) can calculate instruction positions (instruction coordinates) of the first controller 34 on the screen of the monitor 30 and the distance from the first controller 34 to each of the markers 44m and 44n on the basis of the marker coordinate data. For example, when the first controller 34 instructs the left end of the monitor 30, the object images 44m' and 44n' are detected at the right of the imaged image, and when the first controller 34 instructs the lower end of the screen, the object images 44m' and 44n' are detected at the upper portion of the imaged image. In other words, the marker coordinates on the imaged image are detected at positions in reverse to the instruction positions of the first controller 34 on the screen. Accordingly, when the coordinates of the instruction positions of the first controller 34 are calculated from the marker coordinates, the coordinate system is appropriately transformed from the coordinate system of the imaged image in FIG. 8 to a coordinate system for representing positions on the screen.

Additionally, in this embodiment, in the first controller 34, predetermined arithmetic processing is performed on the imaged data to detect the marker coordinates, and the marker coordinate data is transmitted to the game apparatus 12. However, in another embodiment, imaged data is transmitted as controller data from the first controller 34 to the game apparatus 12, and the CPU 46 of the game apparatus 12 performs predetermined arithmetic processing on the imaged data to detect the marker coordinates and the coordinates of the instruction positions.

Furthermore, the distance between the object images in the imaged image is changed depending on the distance between the first controller 34 and each of the markers 44m and 44n. Since the distance between the markers 44m and 44n, the width of the imaged image, and the viewing angle β of the imager 104 are decided in advance, by calculating the distance between the two marker coordinates, the game apparatus 12 can calculate the current distance between the first controller 34, and each of the markers 44m and 44n.

In the game system 10, information selection processing is executed for allowing a user to select an arbitrary item from a plurality of items, and processing the item determined to be selected. In this embodiment, a description is made in a case that the present invention is applied to a character selection in character input processing.

Figure 9:
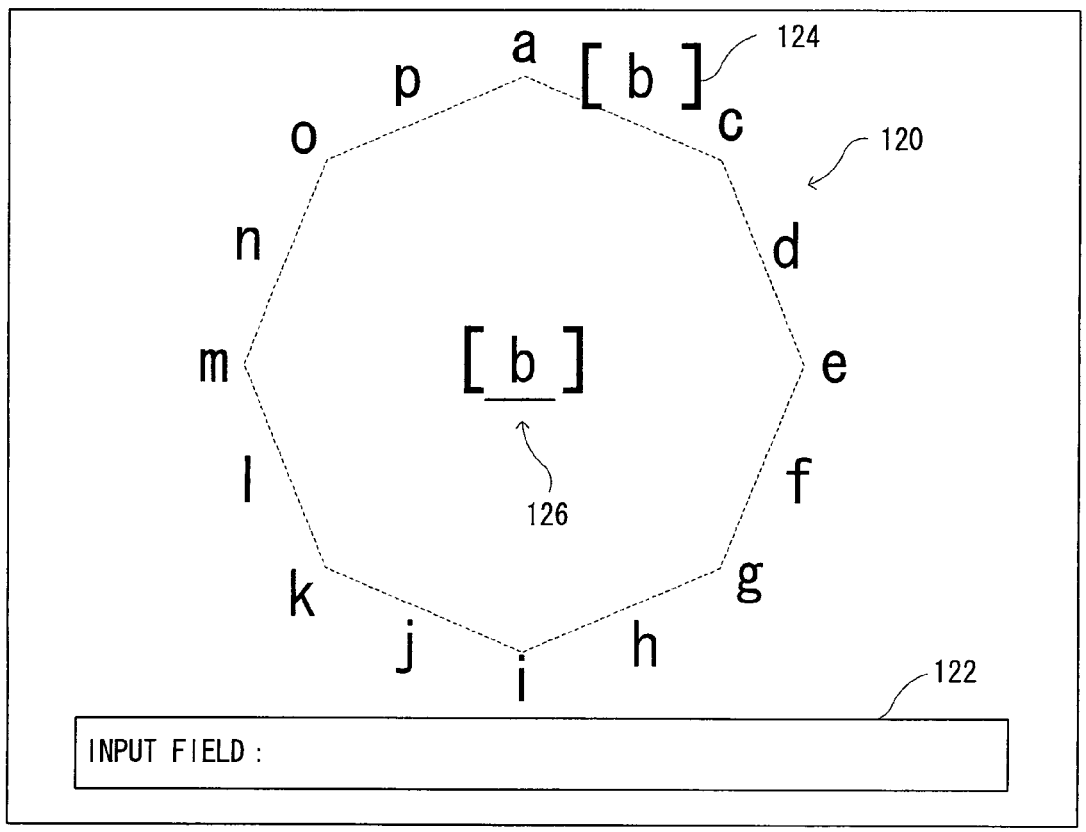
FIG. 9 is an illustrative view showing one example of a character input screen.

FIG. 9 shows one example of a character input screen to be displayed when a character input is performed. On the screen, a list 120 for selecting a character to be input and an input field 122 for displaying the input character are provided. In the list

120, a plurality of characters as a selection item are arranged in a ring form. In detail, the plurality of characters may be arranged in a circle or a polygon. They may be arranged in the arc of a circle, such as a half-round.

Figure 10:
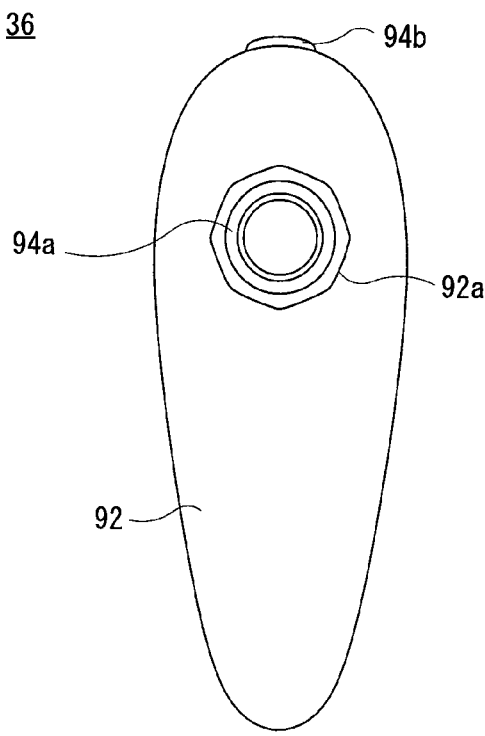
FIG. 10 is a top view of the second controller.

In this embodiment, positions of 16 characters correspond to octagonal vertexes and midpoints of the sides. In FIG. 9, alphabetic characters a-p are clockwise arranged in turn. Selecting an item is performed by a direction instruction by means of the analog joystick 94a. Therefore, in this embodiment, the arranged shape of the selection items is determined by the shape of the guide 92a of the analog joystick 94a. As understood from FIG. 10, to the housing 92 of the second controller 36, the octagonal guide 92a is provided, and the movement like a direction and an amount of the inclination of the analog joystick 94a is restricted by the guide 92a. Especially, the analog joystick 94a is securely engaged at a position of an angle of the guide 92a by the two sides of the guide 92a forming the angle, and this makes it easy for the user to input a direction corresponding to an angle. Accordingly, the selection items in this embodiment are arranged conforming to the guide shape at positions corresponding to the angles and the midpoints of the sides of the octagon.

Furthermore, in the list 120, a cursor 124 to be moved to a position of an item in correspondence to an operation direction of the analog joystick 94a is displayed. When the analog joystick 94a is in a neutral position, that is, it is not operated, the cursor 124 may not be displayed. Furthermore, a display field 126 indicating an item which is currently being selected is provided at the center of the list 120. The display field 126 is represented by parenthesis and an underline, for example, and in FIG. 9, since a character "b" is being selected, a character b is displayed, but if no item is selected, a blank is provided. It should be noted that in FIG. 9, for the sake of simplicity, the list 120 is shown in a larger size at the center of the screen, but the size and the position of the list 120 are arbitrary. In a case that another main image exists, the main image is displayed at the center of the screen, and the list 120 may be displayed in a smaller size at the end of the screen.

Figure 11:
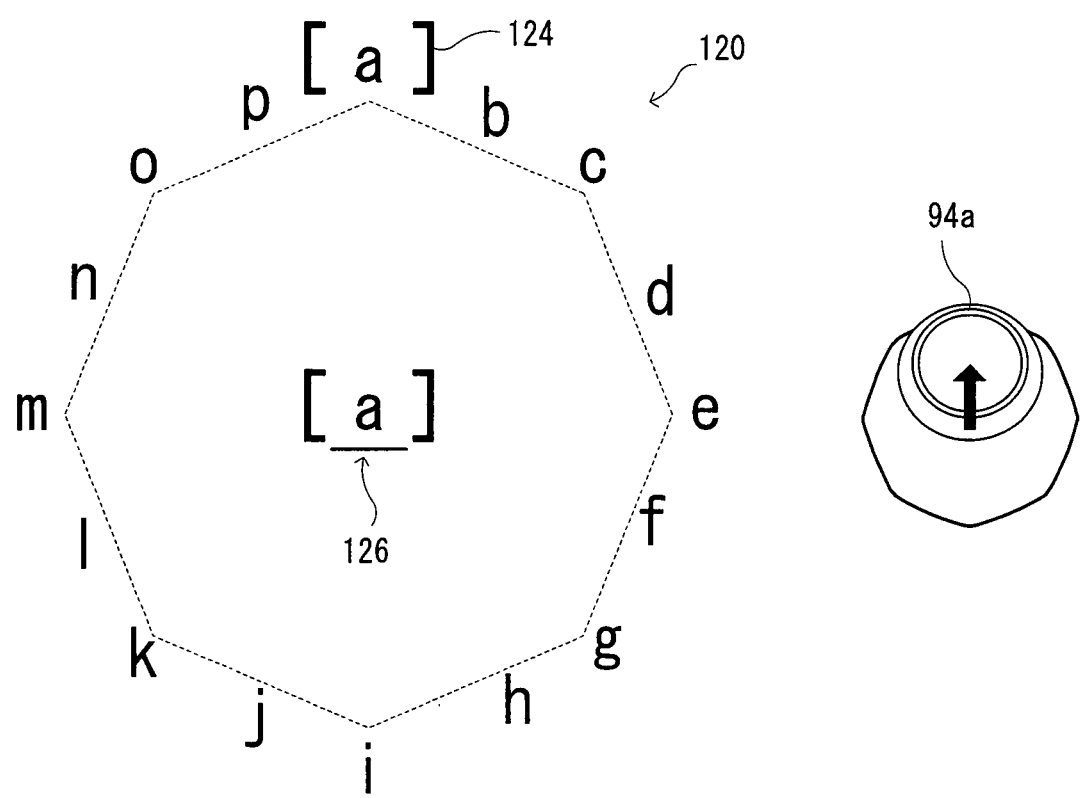
FIG. 11 is an illustrative view showing one example of a character selection by a direction instructing with an analog joystick.

When the analog joystick 94a is operated, an item corresponding to an input direction by the analog joystick 94a is selected. The cursor 124 is moved to an item corresponding to the operation direction by the analog joystick 94a. For example, as shown in FIG. 11, when the analog joystick 94a is upwardly inclined, the cursor 124 is moved to a position of the character "a" corresponding to the upward direction, and in the display field 126 at the center of the list 120, the character "a" which is currently being selected is displayed. Thus, in this embodiment, a simple operation of a direction input by means of the analog joystick 94a allows selection of an item at a position corresponding to the input direction. Additionally, when no operation is performed (no-operation state), the analog joystick 94a may not perform an input to any directions for selecting an item. In this embodiment, in a no-operation state, an item is not selected, and the cursor 124 is not displayed.

In such an item selection in correspondence with the operation direction, there is a limit to the number of correspondences between the directions and items. If a lot of items exist like a character input, it is difficult to simultaneously make all the items candidates to be selected (selection item). In this embodiment, the items are arranged in correspondence with the vertexes and the sides of the octagon of the guide 92a, and therefore, the number of items adopted as candidates for selection at a time is equal to or less than 16. In a case of an input of alphabetic characters, only the characters a-p are selectable at first as shown in FIG. 9. Accordingly, a part of the plurality of items, that is, only the items below the predetermined number are adopted as candidates for selection, and then, the candidates for selection have to be changed. For example, features of adopting a plurality of items as candidates for selection in separate pages, and switching the pages are required. In this embodiment, when a specific continuous direction input operation which is called a sequence input is performed, switching the items is not performed, and this makes it possible to improve operability of the item selection according to the direction input. It should be noted that the shape of the guide 92a may be a polygon except for an octagon, and in any polygonal shape, it is possible to arrange items in correspondence with the vertexes and the midpoints of the sides of the polygon. Here, if the shape has a plurality of angles, it functions as a guide even if it take the form of a strictly polygon, and therefore, the shape includes a curve, for example. Furthermore, the items are brought into correspondence with only the vertex without being brought into correspondence with the sides, and alternatively, the number of pages may be increased.

Figure 12:
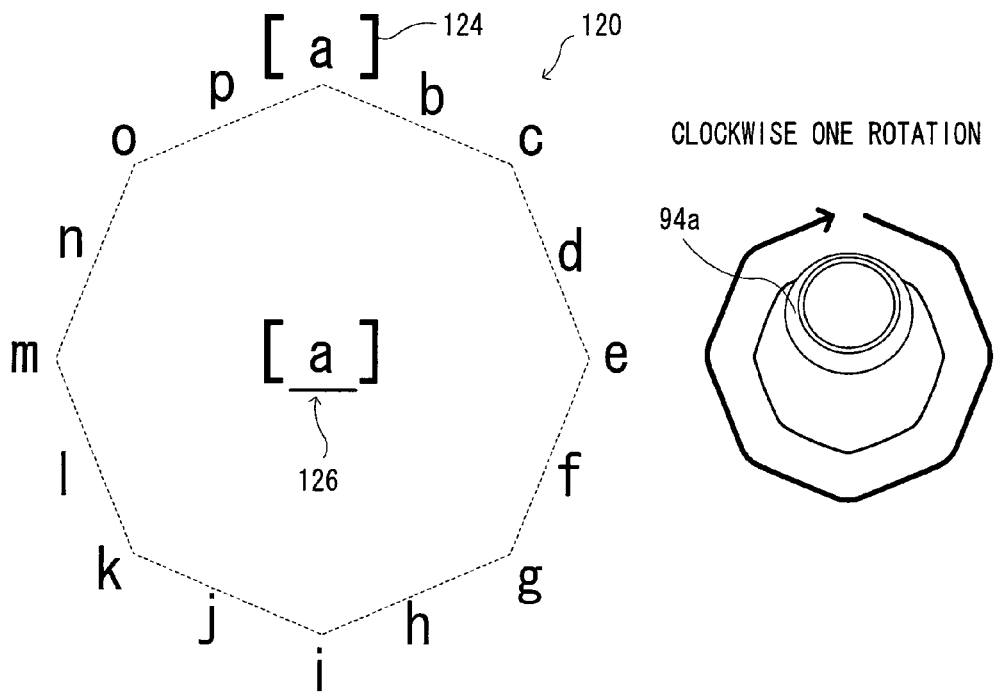
FIG. 12 is an illustrative view showing one example of item switching by a sequence input.
Figure 12:
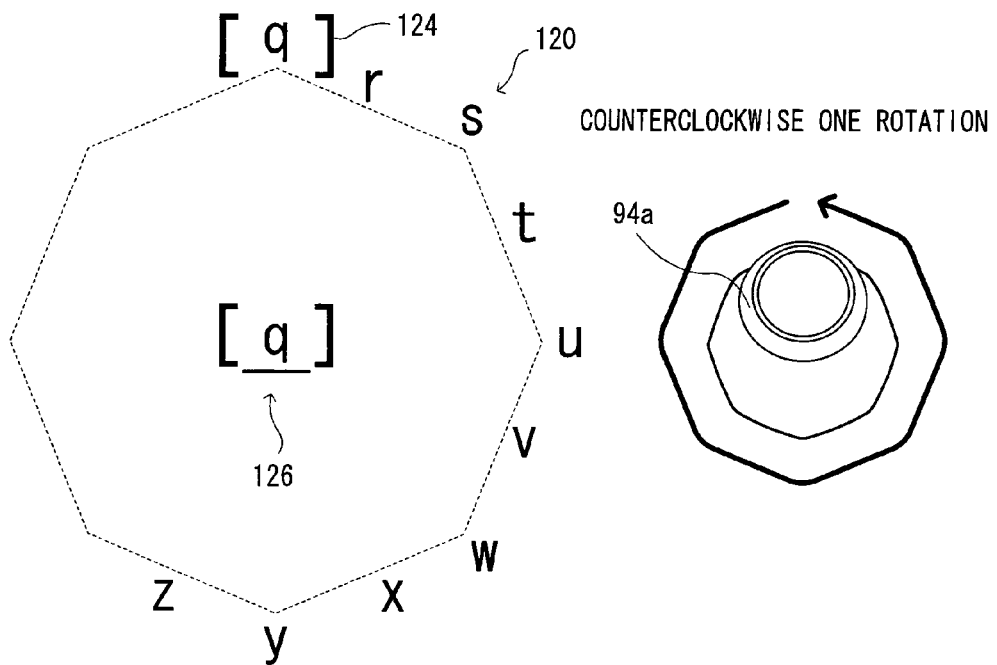

In what follows, a predetermined series of direction inputs accompanying the change of directions is called a sequence input. The sequence input is preferably a series of direction inputs according to a pattern with less error in a general character input operation. FIG. 12 shows one example of an item switching by a sequence input. The condition of establishing a sequence input of this embodiment is that an input direction is one rotation in one direction. That is, when the analog joystick 94a is continuously rotated once in the same direction, it is determined that a sequence input is established, and switching the items is performed. More specifically, when the analog joystick 94a is rotated once to the right, a page down is executed. In FIG. 12, the selection items a-p are switched to selection items q-z. Furthermore, when the analog joystick 94a is rotated once to the left, a page up is executed. In FIG. 12, the selection items of q-z are switched to the selection items of a-p.

Additionally, FIG. 12 shows one rotation starting from an item (a or q) in the upper direction, but a starting position of the rotation is arbitrary. That is, irrespective of an input direction at first, one rotation may be determined. For example, assuming that directions d1, d2, d3, . . . , dn−1, dn assigned to the selection items are arranged clockwise or counterclockwise in this order in a circle, when an input operation according to a series of input operations from the direction d2, the direction d3 . . . the direction dn−1, the direction dn and the direction d1 (to the direction d2) in this order, and a series of input operations from the direction d3, . . . , the direction dn−1, the direction dn, the direction d1, the direction d2 (to the direction d3) in this order are present as well as a series of input operations from the direction d1, the direction d2, the direction d3, . . . the direction dn−1, the direction dn (to the direction d1) in this order, items may be switched.

Thus, similarly to the operation of selecting an item, the items are switched by a sequence input on the basis of a direction input operation, and therefore, it is possible to easily perform an item selection. Furthermore, a sequence input by one rotation is scarcely confused with a character input, and therefore, it is suitable for performing an operation like switching the page different from the character input.

Figure 13:
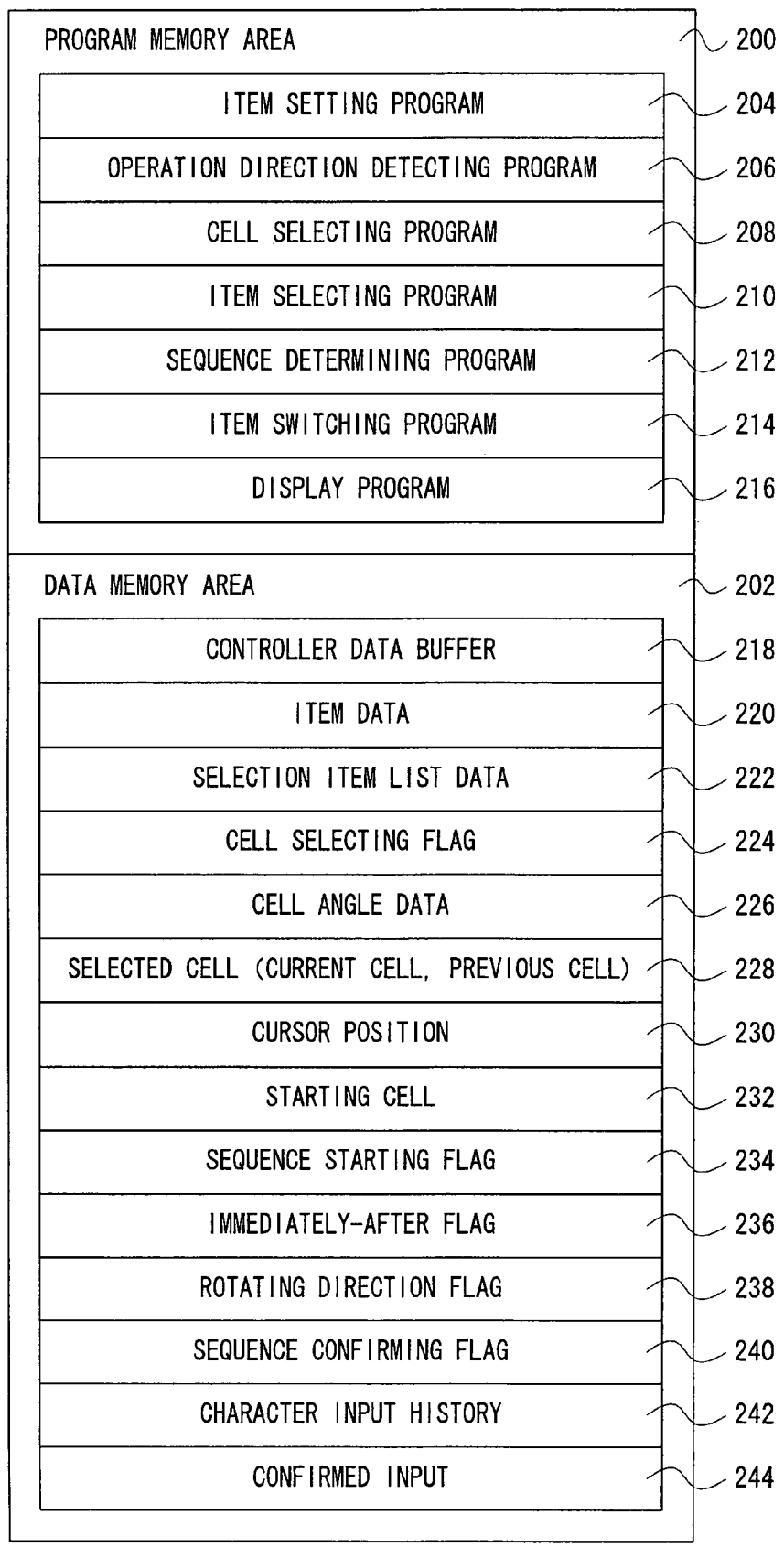
FIG. 13 is an illustrative view showing one example of a memory map.

FIG. 13 shows one example of a memory map. The memory map includes a program memory area 200 and a data memory area 202. A part of the program and the data are read from the optical disk 22 entirely at a time, or partially and sequentially as necessary so as to be stored into the main memory 50. It should be noted that FIG. 13 shows a part of the memory map, which also store other programs and data necessary for the processing. For example, sound data for outputting a sound like a voice, a sound effect, music, etc. and image data for generating a screen are read from the optical disk 22, and stored in the data memory area 202. Additionally, in this embodiment, a part of the program and the data are read from the optical disk 22, but in another embodiment, a nonvolatile storing medium like a flash memory, etc. is integrated in the game apparatus 12, and the program and data stored in advance in the storing medium may be read so as to be stored in the main memory 50. At this time, wireless or wire communication module is provided to the game apparatus 12, and a program downloaded via a network may be stored in the storing medium.

In a memory area 204 of the program memory area 200, an item setting program is stored. The program is a program for setting a selection item from the plurality of items. In order to select an item in correspondence with an input direction of the analog joystick 94a, and therefore, the selection item has to be brought into correspondence with an input direction. Thus, in this embodiment, an area previously brought into correspondence with an input value of the analog joystick 94a is provided, and by bringing the area into correspondence with an item, the item and the input direction are corresponded. The area is called a cell.

Figure 14:
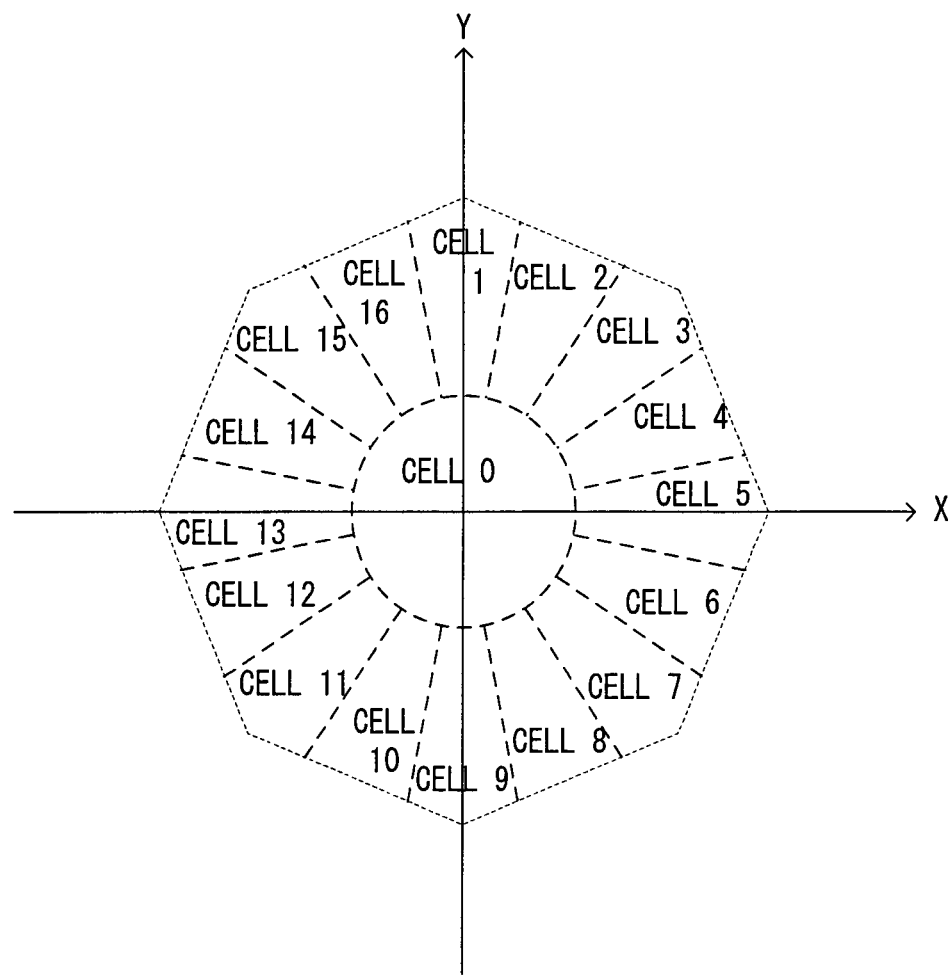
FIG. 14 is an illustrative view showing one example of an arrangement of cells.

In this embodiment, as shown in FIG. 14, within a coordinate plane by the input value of the analog joystick 94a, cells 0-16, that is, 17 areas in total are provided including areas dividing an octagon into 16 and the area around the center of the octagon. The cells 1-16 are associated with the above-described selection items (the above-described a-p, etc.) It should be noted that the central cell 0 corresponds to a case that a direction input is scarcely present (the analog joystick 94a is scarcely operated, that is, the no-operation state), and the cell 0 is not associated with the selection items, and no selection is performed.

The items to be set in the list 120 in association with the cells are selected from the item data 220. FIG. 15 shows a part of the item data. The item data includes a plurality of items, and the respective items are stored as an array (i[1], i[2], . . . ), for example. In FIG. 15 example, alphabetic characters a to z are registered in i[1] to i[26]. Blanks are set from i[27] to i[32]. Various symbols are registered in i[33] to i[48]. Items in relation to numerics are registered in i[49] to i[64]. In addition, uppercase alphabetic characters A to Z, kana, etc. may be registered. Furthermore, a predetermined character string as well as characters may be set as item data. In this embodiment, at the parts indicated by [ ] of i[56], i[58], i[60] and i[65] to i[80], character strings each formed by a plurality of characters are registered as character string data at the lower line in FIG. 15. By registering as an item heavy used character strings such as a part of an address, a domain name, and the like, one input allows an input of a character string, capable of improving efficiency of the character input.

Figures 16, 17, 18:
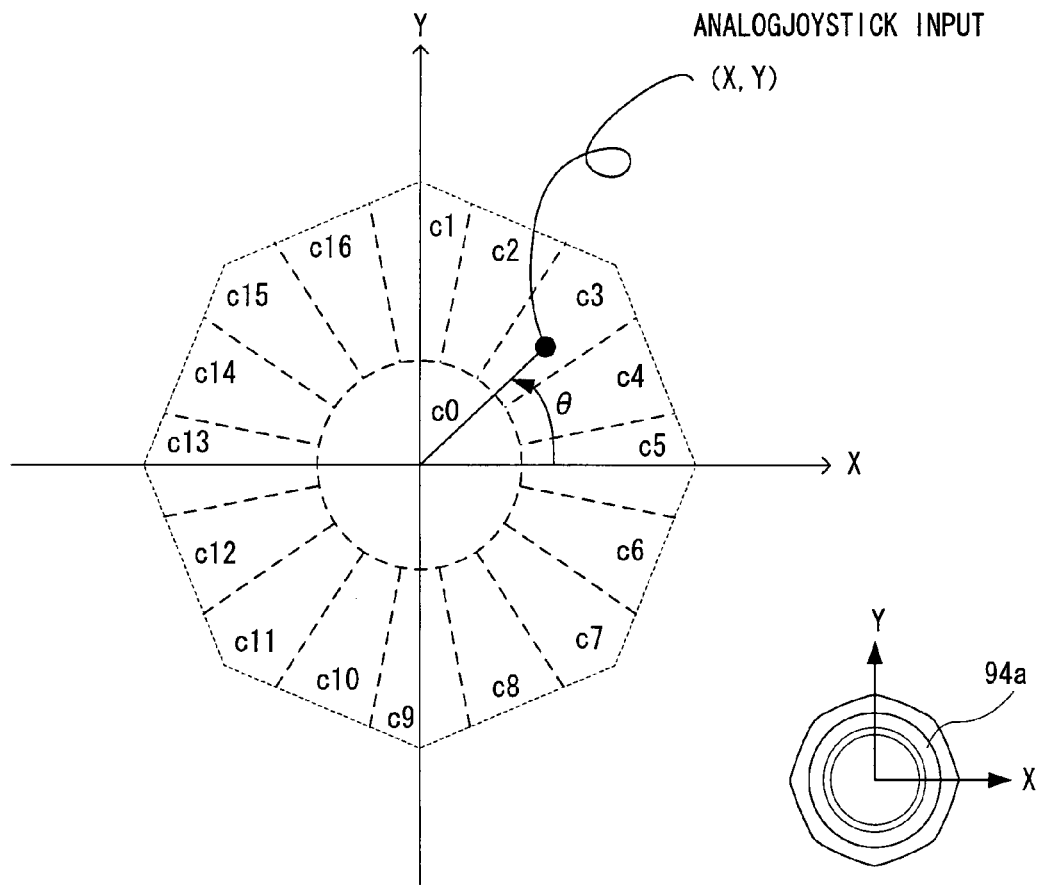
FIG. 16 is an illustrative view showing selection item list data representing a correspondence between cells and items.
FIG. 17 is an illustrative view showing one example of a cell acceptable range with respect to an analog joystick input.
FIG. 18 is an illustrative view showing cell angle data indicating an acceptable angle of each cell.

The predetermined number of items is selected from the item data so as to be corresponded with the cells 1-16. As shown in FIG. 16, selection item list data indicative of a correspondence between a cell ID indicating identification information of a cell and an item ID (for the purpose of discrimination, the ID indicative of i[1], i[2], . . . are represented as i1, i2, . . . ) indicating identification information of an item is generated. In a case of the list 120 shown in FIG. 9, for example, the alphabetic characters a-p (character ID: i1-i16) are set to cells 1-16 (cell ID: c1-c16) as a selection item.

In a memory area 206 of FIG. 13, an operation direction detecting program is stored. The program is a program for detecting an operation direction (input direction) by the user. In this embodiment, an item to be input by the user is instructed by a direction to which the analog joystick 94a is tilted. Accordingly, an input direction by the user is detected on the basis of an input (operation signal) by the analog joystick 94a for the purpose of specifying the item. As shown in FIG. 17, when the horizontal direction of analog joystick 94a is defined as an X axis, and the vertical direction thereof is defined as a Y axis, inclination amounts (X, Y) of the X direction and the Y direction of the analog joystick 94a are included in the controller data. Additionally, an output at a time of a neutral position (no inclination) is (0, 0). When an input (X, Y) of the analog joystick 94a is plotted in the X-Y plane, an angle θ formed by a line connecting (0, 0) and (X, Y) and a reference direction (X axis, for example) is an inclination direction of the analog joystick 94a, that is, an input direction of the user. An operation signal (X, Y) of the analog joystick 94a corresponds to direction data indicating a direction in correspondence with an input operation.

In a memory area 208 of FIG. 13, a cell selecting program is stored. The program is a program for selecting a cell in correspondence with an input direction by the user. As shown in FIG. 17, the cells 1-16 (cell ID: c1-c16) are equally assigned acceptable ranges of input directions by the analog joystick 94a. As shown in FIG. 18, cell angle data bringing each cell into correspondence with an acceptable angle range is stored in advance, and therefore, with reference to the cell angle data, an acceptable angle range including the angle θ calculated by the input (X, Y) by means of the analog joystick 94a is specified, and whereby, a cell corresponding to the input direction by the user can be specified. Additionally, in a case that the magnitude of the input (X, Y) by the analog joystick 94a is below a threshold value, it is considered that a direction input operation is not performed, and the cell 0 is selected. According to the above description, it is possible to specify in which 17 cells an input by the analog joystick 94a is included. It should be noted that in the above-described processing, the angle θ is calculated from an input (X, Y) by the analog joystick 94a, and a cell corresponding to the input direction by the user is specified on the basis of which range the calculated θ belongs to, but the cell may be specified by processing other than this processing. For example, without calculating the angle θ, an area of each cell is defined in the X-Y plane in FIG. 17, and a cell corresponding to an input direction by the user may be specified on the basis of which area an input (X, Y) by the analog joystick 94a is included.

In a memory area 210 of FIG. 13, an item selecting program is stored. The program is a program for selecting an item corresponding to an input direction by the user. According to the above-described cell selecting program, a cell corresponding to an input direction is specified, and therefore, an item corresponding to the cell is specified in reference to the selection item list data shown in FIG. 16. Furthermore, in this embodiment, by performing a predetermined operation with the first controller 34, an input of the item which is being selected by the direction input is determined. Accordingly, the item which is being selected when predetermined operation data is input is specified and output.

In a memory area 212, a sequence determining program is stored. The program is a program for determining whether or not a sequence input is performed on the basis of a shift of an input direction. The sequence input is one rotation in one direction as shown in FIG. 12 in this embodiment, and therefore, it is determined whether or not the input direction is rotated once in one direction. Furthermore, depending on a direction of the rotation, a switching direction (page down or page up) is different, and a rotating direction is also determined. The sequence determining program may determine according to a shift of the selected cell, and may directly determine according to a shift of the input (X, Y) or the angle θ of the analog joystick 94a, etc.

It should be noted that in the sequence input determination, it may be determined that all the directions corresponding to all of the current selection items are input in order by the analog joystick 94a. That is, when the current selection items are item data i1-in, for example, it may be determined that the direction d1 corresponding to it is input, the direction d2 corresponding to i2 is then input, the direction d3 corresponding to i3 is input, . . . , thereafter, the direction dn−1 corresponding to in−1 is input, and the direction dn corresponding to in is input. In this case, it is preferable that the input of the direction d1, the input of the direction d2, the input of the direction d3 . . . the input of the direction dn−1, and the input of the direction dn are continuously performed in this order (that is, without an input in another direction being inserted). Especially, in a case that the analog joystick 94a is input to no direction in a no-operation state, it may be determined a continuous input is performed without the no-operation state being inserted, but the no-operation state may be allowed to be inserted.

Alternatively, in the sequence input determination, after all the directions corresponding to all the current selection items are input by the analog joystick 94a in order, it may be determined that an input of any direction is further performed. Typically, after all the directions are input in order, a direction input at first is further input, and typically, in the above-described example, the input of direction d1, the input of the direction d2, the input of the direction d3, . . . , the input of the direction dn−1, the direction dn, and the input of the direction d1 in this order may be determined. In a processing flow in this embodiment (FIG. 23) described later, the determination is performed, that is, it is determined whether or not the current cell arrives at a sequence input starting cell.

Furthermore, in a case that the input of the direction d1, the input of the direction d2, the input of the direction d3, . . . , the input of the direction dn−1, and the direction dn in this order are determined, inputs at some midpoint may be allowed to be skipped. For example, when that the input of the direction d1, the input of the direction d3, . . . , the input of the direction dn−1, and the direction dn in this order is determined, an affirmative determination may be made.

Figure 19:
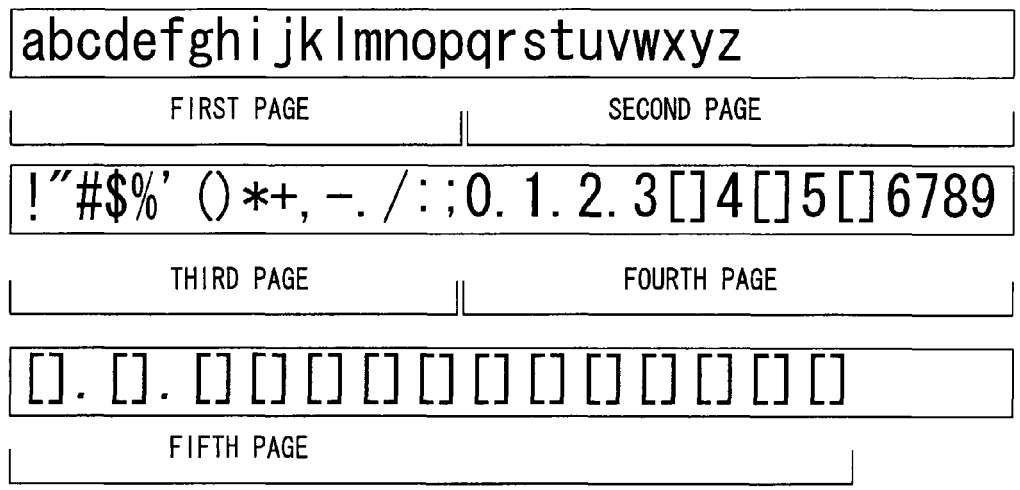
FIG. 19 is an illustrative view showing one example of an item switching.
Figure 20:
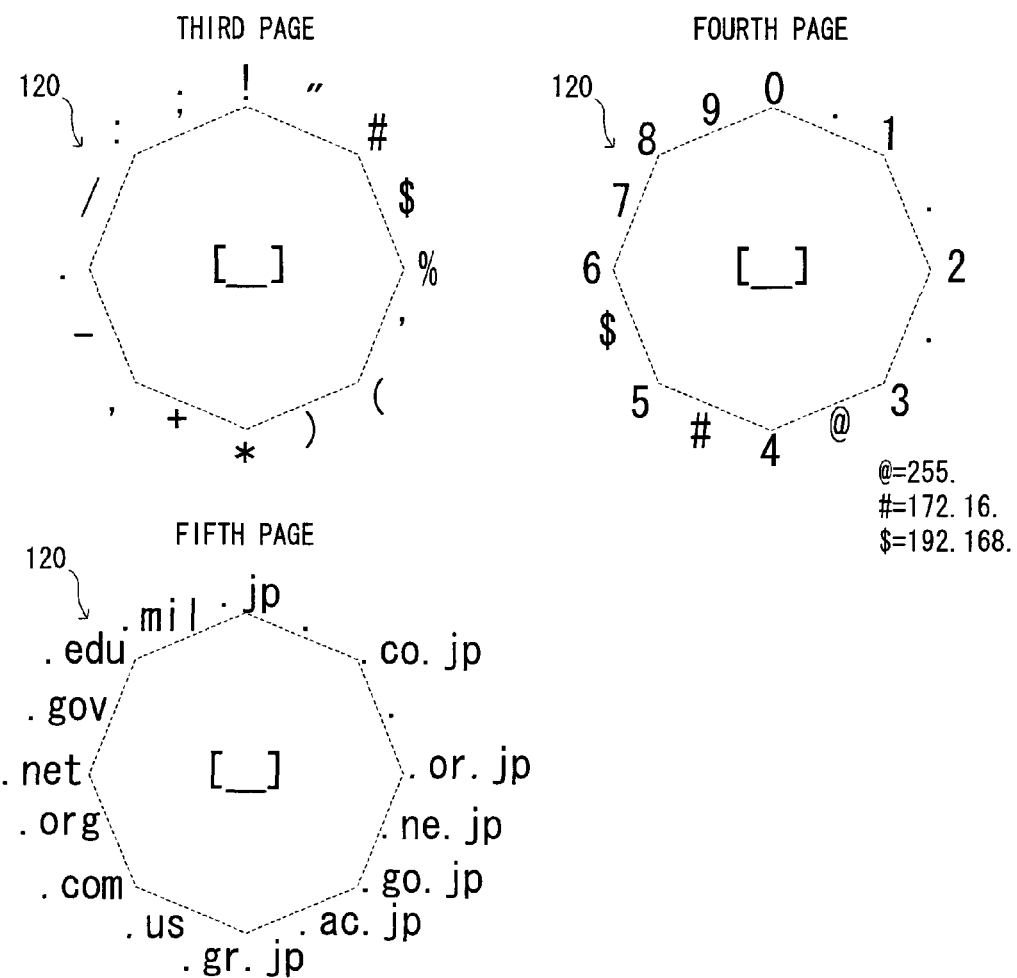
FIG. 20 is an illustrative view showing a selection item list to be displayed by the switching in FIG. 19.

In a memory area 214, an item switching program is stored. This program is a program for switching selection items in response to a sequence input. The switching method is determined in advance. In this embodiment, as shown in FIG. 19, a plurality of items are assigned to a page by the predetermined number. In response to a sequence input, the pages are switched from one page to another to replace all the selection items with other items. The first and second pages are an alphabetical list as shown in FIG. 12. The third-fifth pages are respectively a symbolical list, a numeric list, and a domain name list as shown in FIG. 20. In the fourth page, a character string formed by a plurality of numerics is replaced with a symbol for the sake of display, and the character string corresponding to the symbol is separately displayed, and whereby, it is possible to prevent the display from being complicated. According to the switching method, necessary item data is read from the item data as shown in FIG. 15 to update the selection item list data shown in FIG. 16. At this time, when the selection item list data is generated, it is preferable that the respective items are arranged in an order according to an arrangement order shown in FIG. 15. That is, as in the embodiment, in a case that the item data is arranged in a predetermined order so as to be stored in the program, the item data and the direction are brought into correspondence with each other on the basis of the order of the arrangement.

Typically, the item data and the direction (cell) may be brought into correspondence with each other such that the item data becomes clockwise or counterclockwise in the order of the arrangement.

Additionally, as described above, in a case that the item data is arranged in a predetermined order so as to be stored in the program, in item switching, it is desirable that at least an item arranged at the forefront out of the current selection items is deleted from the selection items, and an item arranged next to the current selection items is added to the selection items (a), or an item arranged at the last out of the current selection items is deleted from the selection items, and an item arranged before the current selection items is added to the selection items (b). Furthermore, in the item switching, typically, switching of all the items shown in FIG. 12 is performed as in this embodiment. That is, when the number of selection items is n pieces, all the current selection items are deleted, and n pieces of items arranged next to the current selection items are made the selection items anew (c), or all the current selection items are deleted, and n pieces of items arranged before the current selection items are made the selection items anew (d). In addition, in the sequence input determination, the first series of input operations (clockwise one rotation in this embodiment) and the second series of input operations (counterclockwise one rotation in this embodiment) different therefrom are determined, and when the first series of input operations is performed, the above-described (a) (or (c)) processing may be executed, and when the second series of input operations is performed, the above-described (b) (or (d)) processing may be executed, for example.

Additionally, as in this embodiment, in a case that all the current selection items are replaced with other items, the number of selection items is n pieces, the n pieces of selection items are regarded as one group, and whereby, respective groups may be arranged in a predetermined order and stored in the program. Then, in item switching, a group arranged next to the current group may be selected, or a group arranged before the current group may be selected.

In a memory area 216, a display program is stored. According to the program, image data of the screen including the list 120 indicative of the selection item is generated, and the screen is displayed on the monitor 30.

A memory area 218 of the data memory area 202 is a controller data buffer, and stores controller data received from the controller 14 via the Bluetooth communication unit 76. In a memory area 220, item data indicative of a plurality of items as shown in FIG. 15 is stored. The item data is stored in advance in the optical disk 22. In a memory area 222, selection item list data indicating a correspondence between the cells and the items as shown in FIG. 16 is stored. The selection item list data is generated by an item setting program, and updated by an item switching program.

In a memory area 224, a cell selecting flag is stored. The cell selecting flag is a flag for indicating whether or not selecting a cell except for the cell 0 (direction input) is performed. When it is determined that the magnitude (that is, an inclination amount of the analog joystick 94a) of the input by the analog joystick 94a is equal to or more than a predetermined threshold value, and a direction input is performed, the cell selecting flag is turned on.

In a memory area 226, cell angle data indicating a cell acceptable range shown in FIG. 18 is stored. The cell angle data is stored in advance in the optical disk 22. However, even if the cell angle data itself is not stored in the optical disk 22, the cell angle data may be calculated and may be stored by the processing of the program according to the necessary number of items.

In a memory area 228, information indicative of a selected cell is stored. The information includes a current cell indicative of a cell which is being selected in the current frame (cell ID) and a previous cell indicative of the cell selected at the previous frame (cell ID).

In a memory area 230, a cursor position is stored. Position information of the cursor 124 on the list 120 is stored. The position of the cursor 124 is stored in advance by being brought into correspondence with each of the cells 1-16. In the memory area 230, a position corresponding to the cell which is being selected is stored.

In a memory area 232, a starting cell is stored. The starting cell indicates a cell (cell ID) selected when a sequence input is started. In a memory area 234, a sequence starting flag is stored. The sequence starting flag is turned on when a sequence input is started. In a memory area 236, an immediately-after flag is stored. The immediately-after flag is provided for determining whether or not the frame is a frame immediately after starting a sequence input. This is because that the rotating direction of the sequence input has to be detected at the frame directly after storing the sequent input. In a memory area 238, a rotating direction flag is stored. The rotating direction flag indicates the rotating direction (right or left) of a sequence input. In the memory area 240, a sequence confirming flag is stored. The sequence confirming flag is turned on when it is determined that a sequence input is established.

In a memory area 242, a character input history is stored. In this embodiment, a predetermined operation is performed by the first controller 34 in a state that any one of the cells 1-16 is selected by a direction input with the analog joystick 94*a*, and whereby, an input of an item (character) corresponding to a selected cell is determined, making it possible to input the character. In the memory area 242, when a predetermined operation is detected on the basis of the controller data by the first controller 34, a character (character ID) corresponding to the cell selected by the direction input is stored.

In a memory area 244, a confirmed input is stored. In this embodiment, when a predetermined operation is performed with the first controller 34 in a state that a direction input is not performed with the analog joystick 94*a*, a character input is confirmed. Accordingly, when a predetermined operation is detected on the basis of the controller data of the first controller 34 in a state that any of the cells 1-16 is not selected, a character input history of the memory area 242 is stored in the memory area 244 as a confirmed input.

Figure 21:
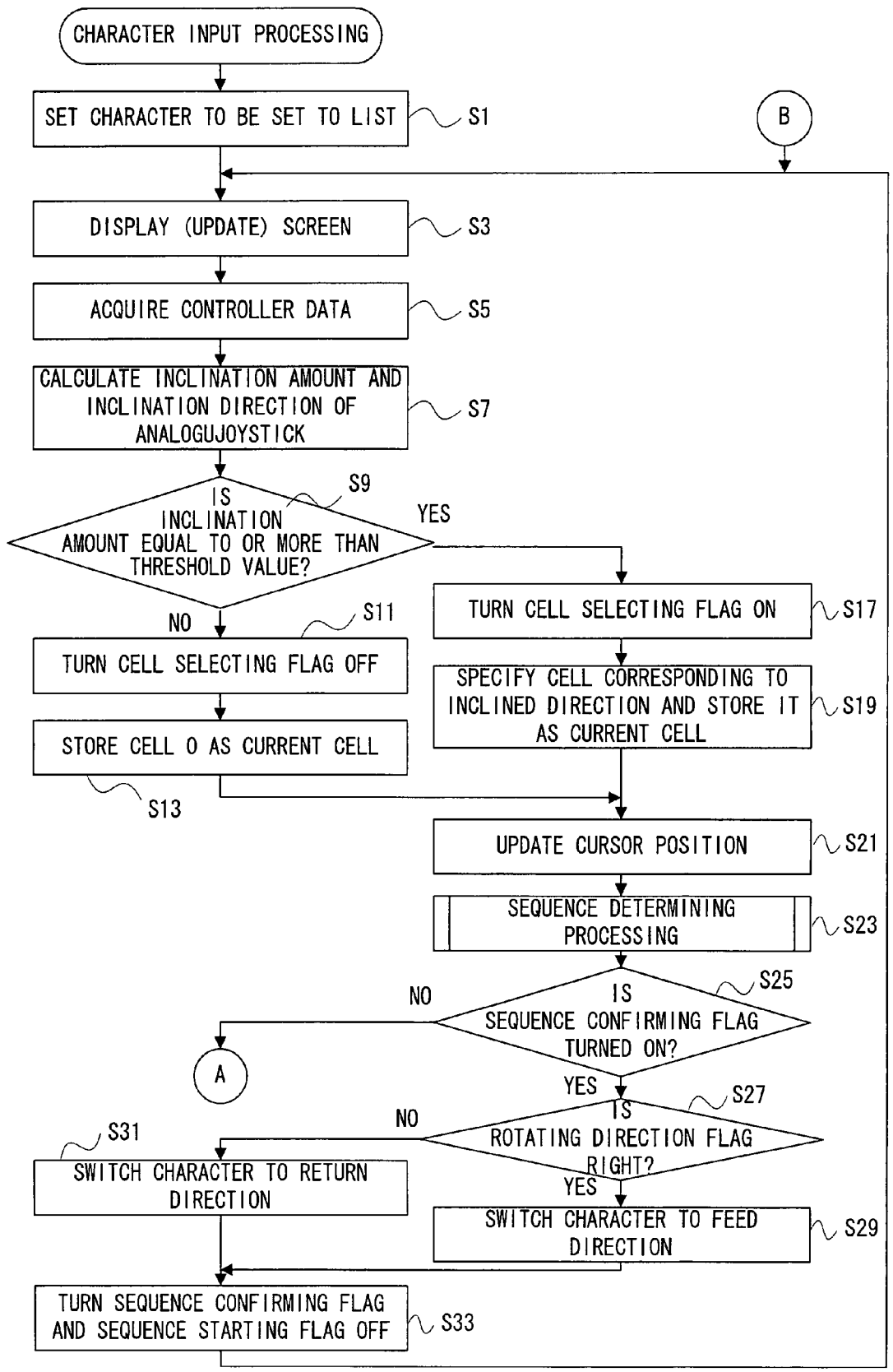
FIG. 21 is a flowchart showing a part of one example of an operation of character input processing in the game apparatus.
Figure 22:
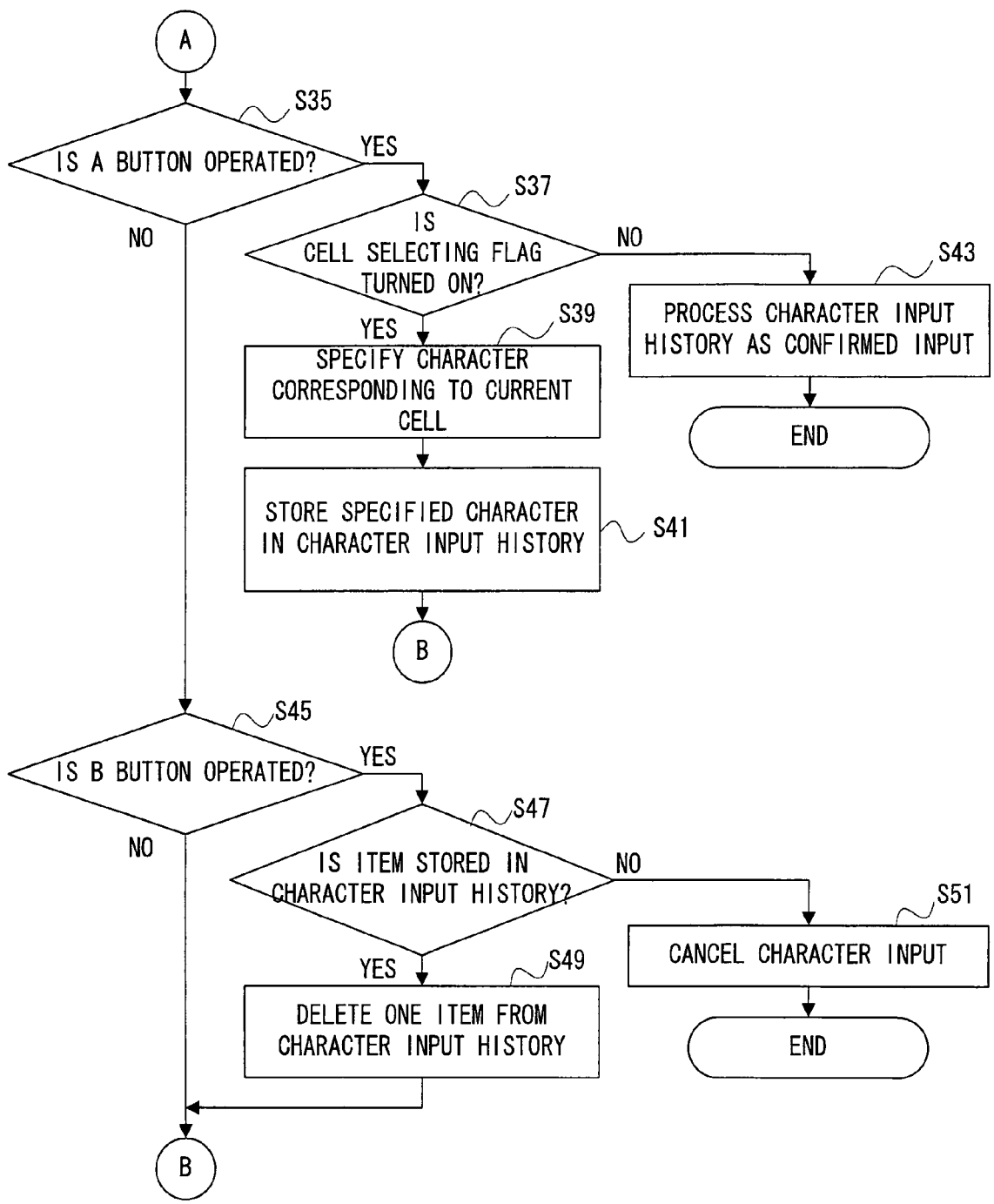
FIG. 22 is a flowchart continued from FIG. 21.

FIG. 21 and FIG. 22 show one example of an operation of the CPU 46 in character input processing. When the character input processing is started, the CPU 46 executes setting of a character to be set in the list 120 according to an item setting program in a step S1. More specifically, the predetermined number of characters are selected from the item data, and respectively assigned to the cells 1-16 to generate the selection item list data (FIG. 16). In this embodiment, as shown in FIG. 19, the predetermined number of items out of a plurality of items (characters) are assigned to a predetermined page, and the step S1 is an initial setting of the list 120, and therefore, the selection items on the first page are brought into correspondence with the cells 1-16.

Next, in a step S3, the CPU 46 displays or updates a screen according to a display program. More specifically, the CPU 46 generates image data of the screen including the list 120 shown in FIG. 9 by utilizing the GPU 52, and displays the screen on the monitor 30. With reference to the selection item list data, as shown in FIG. 9, the respective items are displayed in such an arrangement manner as to be brought into correspondence with the positional relation of the cells 1-16. The cursor 124 is displayed in a cursor position. In a case that the current cell of the memory area 228 is not the cell 0, an item corresponding to the current cell is displayed in the display field 126. Furthermore, in a case that a character input history is stored in the memory area 242, a history of the character input is displayed in the input field 122.

Succeedingly, in a step S5, the CPU 46 acquires controller data from the memory area 218. The controller data includes operation data of the operating portion 94 of the second controller 36, operation data of the operating portion 82 of the first controller 34, acceleration data of the acceleration sensors 86 and 96, imaging object data of the imaged information arithmetic section 88, etc. Accordingly, direction data of the analog joystick 94*a*, operation data of the A button 82*d* and the B button 82*h*, etc. can be taken in.

In a step S7, the CPU 46 calculates an inclination amount and an inclination direction of the analog joystick 94*a* from an operation signal according to an operation direction detecting program. The operation signal (X, Y) of the analog joystick 94*a* indicates inclination amounts in the X direction and the Y direction (FIG. 17). Accordingly, by calculating the magnitude of (X, Y), it is possible to obtain a total inclination amount of the analog joystick 94*a*. Furthermore, by calculating the angle θ of (X, Y) (FIG. 17), it is possible to obtain an inclination direction, that is, an input direction of the analog joystick 94*a*.

Then, in a step S9, the CPU 46 determines whether or not the inclination amount is equal to or more than a predetermined threshold value. By the determination with respect to a threshold value, an unclear input is eliminated, capable of clearly determining whether or not a direction input is performed with the analog joystick 94*a*.

If "NO" in the step S9, that is, if it is determined that the cell 0 is selected and a direction input is not performed, the CPU 46 turns the cell selecting flag of the memory area 224 off in a step S11. Furthermore, in a step S13, the CPU 46 stores the cell 0 as a current cell in the selection cell memory area 228. After completion of the step S13, the process proceeds to a step S21.

On the other hand, if "YES" in the step 9, that is, if a direction input is performed, the CPU 46 turns a cell selecting flag of the memory area 224 on in a step S17. Furthermore, in a step S19, the CPU 46 specifies a cell corresponding to the inclination direction on the basis of the cell angle data (FIG. 18) according to the cell selecting program, and stores the cell as a current cell in the selected cell memory area 228.

Next, in a step S21, the CPU 46 updates the cursor position of the memory area 230 with a position corresponding to the current cell. When the cell 0 is in a selected state, the cursor position becomes the cell 0, and in this case, displaying the cursor 124 is not performed.

Succeedingly, in a step S23, the CPU 46 executes sequence determining processing according to a sequence determining program. The operation of the sequence determining processing is shown in FIG. 23 in detail.

Figure 23:
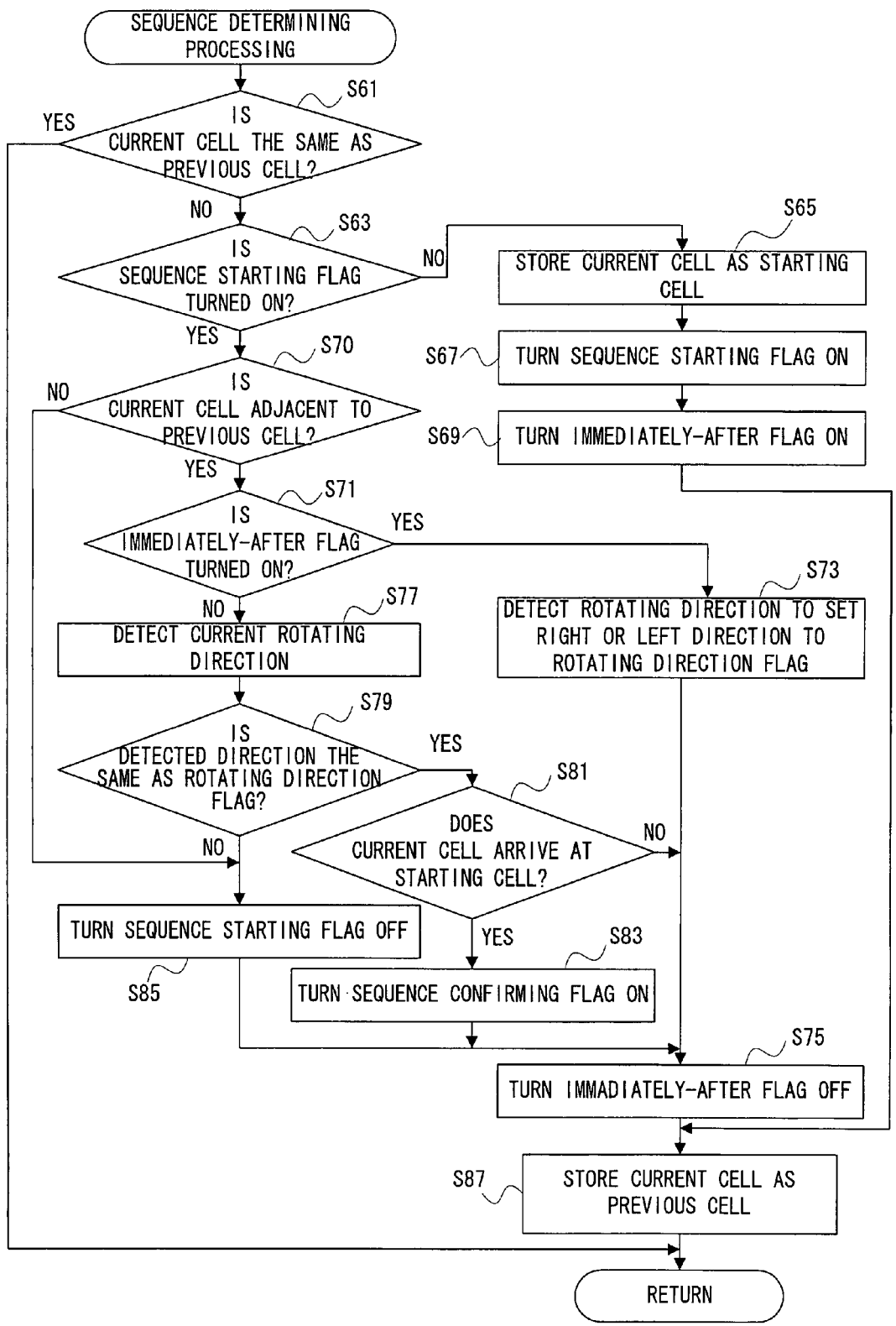
FIG. 23 is a flowchart showing one example of an operation of sequence determining processing shown in FIG. 21.

In a first step S61 of FIG. 23, the CPU 46 determines whether or not the current cell is the same as the previous cell with reference to the memory area 228. Additionally, an initial value of the previous cell shall be the cell 0. When the same cell is continued to be selected, "YES" is determined in the step S61, and the process returns to a step S25 in FIG. 21.

If "NO" in the step S61, the CPU 46 determines whether or not a sequence starting flag of the memory area 234 is turned on in a step S63. If "NO" in the step S63, that is, if it is the first timing of the sequence input, an initial setting is performed. That is, the CPU 46 stores the current cell of the memory area 228 in the memory area 232 as a sequence input starting cell in a step S65. Furthermore, the CPU 46 turns a sequence starting flag of the memory area 234 on in a step S67, and turns an immediately-after flag of the memory area 236 on in a step S69. After completion of the step S69, the process proceeds to a step S87.

On the other hand, if "YES" in the step 63, that is, when the determination of the sequence input has already been started, the CPU 46 determines whether or not the current cell is a cell adjacent to the previous cell in a step S70. Here, the sequence determination processing is performed for detecting a rotation, and therefore, the adjacent cell does not include the cell 0. Furthermore, if the analog joystick 94*a* is rotated at a high speed, and so forth, a cell which is nearby with one or a plurality of cells from a previous cell may be allowed as well as the adjacent cell because it is assumed that a cell is detected while one or a plurality of cells is being skipped due to the detection timing of the cell, etc. If "NO" is determined in the step S70, the process proceeds to a step S85 to cancel the sequence input state by the following processing. If "YES" is determined in the step S70, the CPU 46 determines whether or not the immediately-after flag of the memory area 236 is turned on in a step S71. If "YES" in the step 71, that is, if it is a time directly after starting the determination of the sequence input, the CPU 46 detects a rotating direction, and sets the result (right or left) in a rotating direction flag of the memory area 238 in a step S73. The rotating direction of the sequence input is detected from the positional relationship between the starting cell and the current cell. As described above, if a rotating operation by the user is at a high speed, a selected cell might advance to the two preceding cell during one frame. Thus, it is only necessary to detect whether or not the current cell exists at the right or left of the starting cell within a range of the predetermined number of the cells from the starting cell as well as the cells adjacent to the starting cell. Or, by detecting which rotating directions have few in number of the cells from the starting cell to the current cell in the clockwise direction or the counterclockwise direction, the rotating direction of a sequence input can be detected. In a succeeding step S75, the CPU 46 turns the immediately-after flag of the memory area 236 off. After completion of the step S75, the process proceeds to a step S87.

On the other hand, if "NO" in the step S71, that is, if the rotating direction of the sequence input has already been detected, the CPU 46 detects a current rotating direction in a step S77. The current rotating direction is detected from the positional relationship between the previous cell and the current cell by a processing similar to that in the step S73.

Then, in a step S79, the CPU 46 determines whether or not the detected direction is the same as the direction set to the rotating direction flag of the memory area 238. That is, it is determined whether or not the rotating direction of the sequence input continues to be the same from the starting point.

If "YES" in the step 79, that is, if the rotating direction is not changed, the CPU 46 determines whether or not the current cell arrives at the starting cell in a step S81. That is, it is determined whether or not a sequence input in this embodiment like one rotation to one direction is established. If "YES" in the step 81, the CPU 46 turns a sequence confirming flag of the memory area 240 on in a step S83. After completion of the step S83, or if "NO" in the step S81, the process proceeds to the step S75.

On the other hand, if "NO" in the step S79, that is, if the rotating direction is changed from that immediately after the sequence input, a sequence input is not established. The CPU 46 turns the sequence starting flag of the memory area 234 off in a step S85. After completion of the step S85, the process proceeds to the step S75.

After the immediately-after flag is turned off in the step S75, the CPU 46 stores in the memory area 228 the current cell as a previous cell for processing at a next frame in the step S87. After completion of the step S87, the sequence determining processing is ended, and the process returns to the step S25 in FIG. 21.

In the step S25 of FIG. 21, the CPU 46 determines whether or not the sequence confirming flag of the memory area 240 is turned on. If "YES" in the step 25, that is, if a sequence input is established, the CPU 46 determines whether or not the rotating direction flag of the memory area 238 is right in a step S27.

If "YES" in the step 27, that is, if one rotation in a clockwise direction is established, the CPU 46 switches the character to a feed direction according to the item switching program in a step S29. In this embodiment, items on the next page are read from the item data, and all the items are replaced with the items on the next page in the selection item list data of the memory area 222. It should be noted that if the current page is the last page, the items on the last page may be replaced with the items on the first page.

On the other hand, if "NO" in the step S27, that is, if one rotation in a counterclockwise direction is established, the CPU 46 switches the character to a return direction in a step S31. That is, items on the previous page are read from the item data, and all the items are replaced with the items on the previous page in the selection item list data of the memory area 222. It should be noted that if the current page is the first page, the items on the first page may be replaced with the items on the last page.

After completion of the step S29 or S31, the CPU 46 turns the sequence confirming flag of the memory area 240 and the sequence starting flag of the memory area 234 off in a step S33. After completion of the step S33, the process returns to the step S3. Accordingly, as shown in FIG. 12, the switched list 120 is displayed on the screen.

On the other hand, if "NO" in the step S25, that is, if a sequence input is not established, the process proceeds to a step S35 in FIG. 22.

In the step S35 in FIG. 22, the CPU 46 determines whether or not the A button 82*d* is operated on the basis of operation data of the first controller 34. If "YES" in the step 35, the CPU 46 determines whether or not the cell selecting flag of the memory area 224 is turned on in a step S37. If "YES" in the step 37, that is, when the A button 82*d* is pushed while a direction input by the analog joystick 94*a* is performed, it is considered that the user determines a character to be input. Thus, in a step S39, the CPU 46 specifies a character corresponding to the current cell by referring to the selection item list data. Then, in a step S41, the CPU 46 outputs the specified character, that is, stores it in the character input history of the memory area 242. After completion of the step S41, the process returns to the step S3 in FIG. 21. Accordingly, the character stored in the character input history is displayed in the input field 122 of the screen.

On the other hand, if "NO" in the step S37, that is, if the A button 82*d* is pushed in a state a direction input with the analog joystick 94*a* is not performed, it is considered that the user finishes inputting the character. Thus, in a step S43, the CPU 46 processes the character input history in the memory area 242 as a confirmed input. For example, the character input history is output (stored) in the predetermined memory area 244 as a confirmed input, and executes processing utilizing textual information of the confirmed input. After completion of the step S43, the character input processing is ended.

Furthermore, if "NO" in the step S35, the CPU 46 determines whether or not the B button 82h is operated on the basis of operation data of the first controller 34 in a step S45. If "YES" in the step 45, the CPU 46 determines whether or not an item is stored in the character input history memory area 242 in a step S47. If "YES" in the step 47, it is considered that the input of the character directly before is canceled. Thus, in a step S49, the CPU 46 deletes one item (character or character string) input last from the character input history of the memory area 242. After completion of the step S49, the process returns to the step S3 in FIG. 21. Thus, a character last input is erased from the input field 122 on the screen.

On the other hand, if "NO" in the step S47, that is, if the B button 82h is pushed in a state that no item is input, it is considered that the character input itself is canceled. Thus, the CPU 46 executes cancellation of the character input in a step S51 to end the character input processing.

According to this embodiment, in the item selection by instructing a direction, selection items are switched in correspondence with a predetermined series of direction inputs, and therefore, it is possible to improve operability of the item selection. Similar to the item selection, items are switched by a direction input operation, and therefore, there is no need of providing an operation button for switching, allowing an easy operation for switching, and making an accidental switching less.

Figure 24:
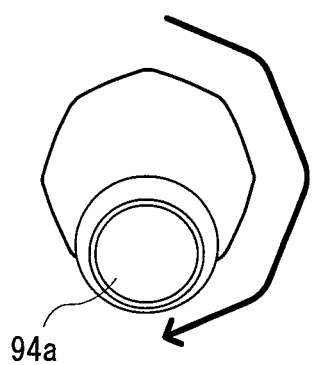
FIG. 24 is an illustrative view showing a modified example of a sequence input.
Figure 24:
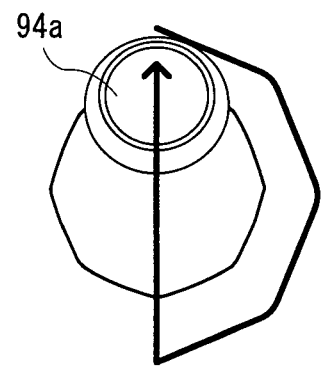
Figure 24:
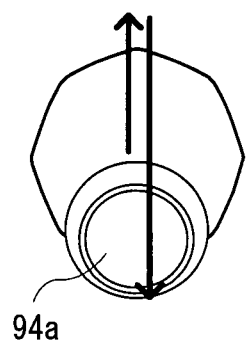
Figure 24:
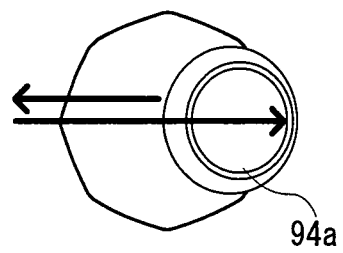

Furthermore, in the above-described embodiment, a sequence input for switching is one rotation in one direction. In the sequence input operation, a direction input operation is continuously performed according to a predetermined order. Thus, the sequence input may only be a direction input accompanying a predetermined series of changes, and a changing manner of the direction of the sequence input may be changed as necessary. In addition, the sequence determining processing in the step S23 may be changed as necessary for determining whether or not each sequence input is established on the basis of the shift of the direction data. FIG. 24 shows a modified example of a sequence input. The sequence input in FIG. 24 (A) is a half rotation. The sequence input in FIG. 24 (B) is an input making a half turn and returning to the starting cell. The sequence input in FIG. 24 (C) is an input returning from an upper direction instruction to a lower direction. The sequence input in FIG. 24 (D) is an input returning from a left direction instruction to a right direction. As a condition, the sequence inputs shown in FIGS. 24 (C) and (D) has to be performed in a brief time for being discriminated from a merely erroneous direction input and hesitation, etc., that is, be input within a predetermined time.

Figure 25:
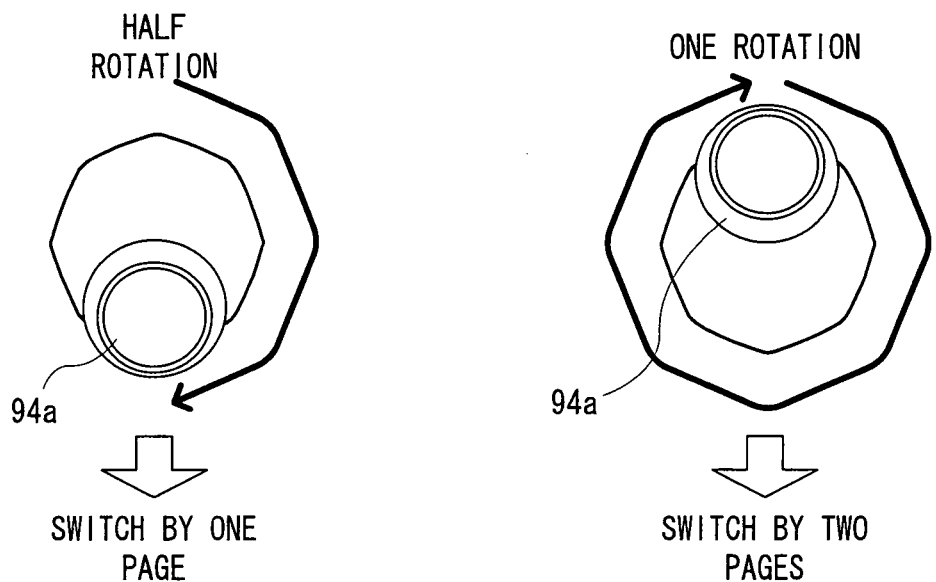
FIG. 25 is an illustrative view showing one example of an item switching in correspondence with the kind of the sequence input.

Also, in other embodiment, in sequence determining processing, the kind of a sequence input is further determined, and a switching method of items may be differentiated depending on the kind. FIG. 25 shows one example thereof. In FIG. 25, when a sequence input by a half rotation is performed, a switching is performed by one page, and when a sequence input by one rotation is performed, a switching is performed by two pages.

In a further embodiment, the kind of the sequence input is brought into correspondence with each page. In this case, a switching is directly made to a page corresponding the kind of the sequence input, that is, a switching is directly made to a desired page by the user, capable of improving efficiency of the item selection.

Figure 26:
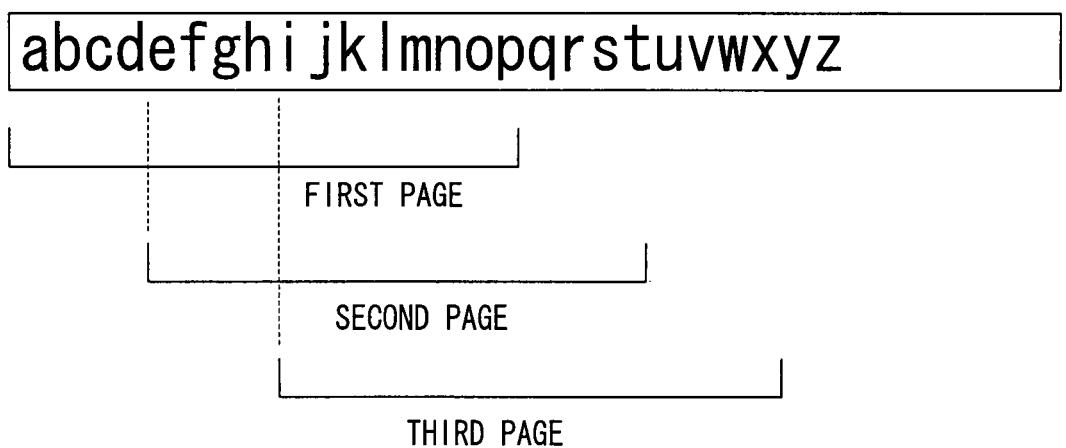
FIG. 26 is an illustrative view showing a modified example of the item switching.

Furthermore, in each of the above-described embodiments, as shown in FIG. 19, a plurality of items are divided into pages, and in item switching, a page up and a page down are performed. That is, all the items of the selection item are replaced. However, in the other embodiment, a part of items are only replaced. FIG. 26 shows a modified example of the item switching. According to the setting in FIG. 26, four items are replaced for each sequence input. With respect to the replacement of a part of items, only one, ⅛, ¼, half, ¾, etc. of the current selection items may be replaced with other items.

Also, in each of the above-described embodiments, in response to an operation with the B button 82h of the first controller 34, the character input directly before is canceled. However, in the other embodiment, an item for making a cancellation may be provided in the selection items.

Additionally, in each of the above-described embodiments, the A button 82d and the B button 82h of the first controller 34 are utilized for determining and cancelling a character input. However, in other embodiment, a function for inputting and cancelling characters may be assigned to the C button 94b and the Z button 94c of the second controller 36. In this case, by a single-handed operation with the second controller 36, it is possible to easily perform a character input. This makes it possible to make an operation for another processing by means of the first controller 34 held with the other hand. For example, a character input (chat, for example) is performed by an operation of the second controller 36 held with one hand while a game is played by an operation of the first controller 34 held with the other hand. Furthermore, as to the second controller 36, the analog joystick 94a is provided in a position where the thumb is placed when the user holds the housing 92 with a single hand, and the C button 94b and the Z button 94c are provided in such positions where the index finger or the middle finger is placed when the user holds the housing 92 with a single hand, capable of improve operability.

Furthermore, in other embodiment, for determining and cancelling an input of the character, data taken in by the acceleration sensors 86 and 96, or the imaged information arithmetic section 88 may be utilized without utilizing the data taken in by a button operation of the operating portions 82 and 94 of the controller 14. For example, when an acceleration value, a changed amount of acceleration, or the like satisfying a predetermined condition is detected by the acceleration sensor 86 or the acceleration sensor 94, that is, when a predetermined motion is detected by the first controller 34 or the second controller 36, determining and cancelling a character input may be performed. Or, when it is determined that an instruction position or changes of the instruction position by the first controller 34 satisfies a predetermined condition on the basis of the data taken in by the imaged information arithmetic section 88, that is, when a predetermined movement is detected by the first controller 34, determining and cancelling a character input may be performed.

Furthermore, in each of the above-described embodiments, items are characters, but the present invention may be applied to selecting various information, such as an item selection of the game, a menu selection, etc.

Figure 27:
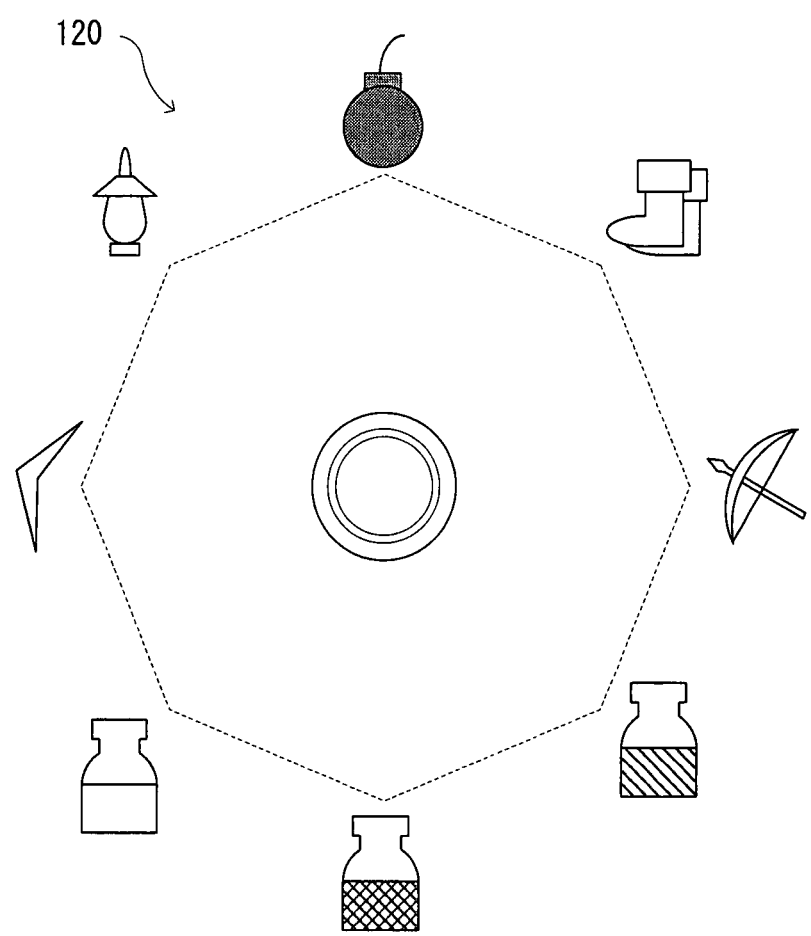
FIG. 27 is an illustrative view showing one example of a selection item list including game items.

FIG. 27 shows one example of the list 120 taking game items as a selection item. In the list 120, a bomb, shoes, a bow, medicines 1-3, a boomerang, a lamp, etc. are arranged in a circle as items to be utilized by the player character. In the list 120, the items are arranged at positions corresponding to vertexes of the octagon. That is, an area of cells 1-8 obtained by dividing the octagon into eight and an area of the cell 0 around the center of the octagon are provided. At the center of the list, an image representative of the head of the analog joystick 94a is displayed, and it is possible to show that an item selection is possible by a direction instruction of the analog joystick 94a. In this game also, similar to the above-described character input, all or a part of the selection items are switched to other items by a sequence input, capable of performing an easy item selection.

Furthermore, in this embodiment, by moving the first controller 34 in a state that an item is being selected by a direction input with the analog joystick 94a, it is possible to execute the game processing on the basis of the item which is being selected.

Figure 28:
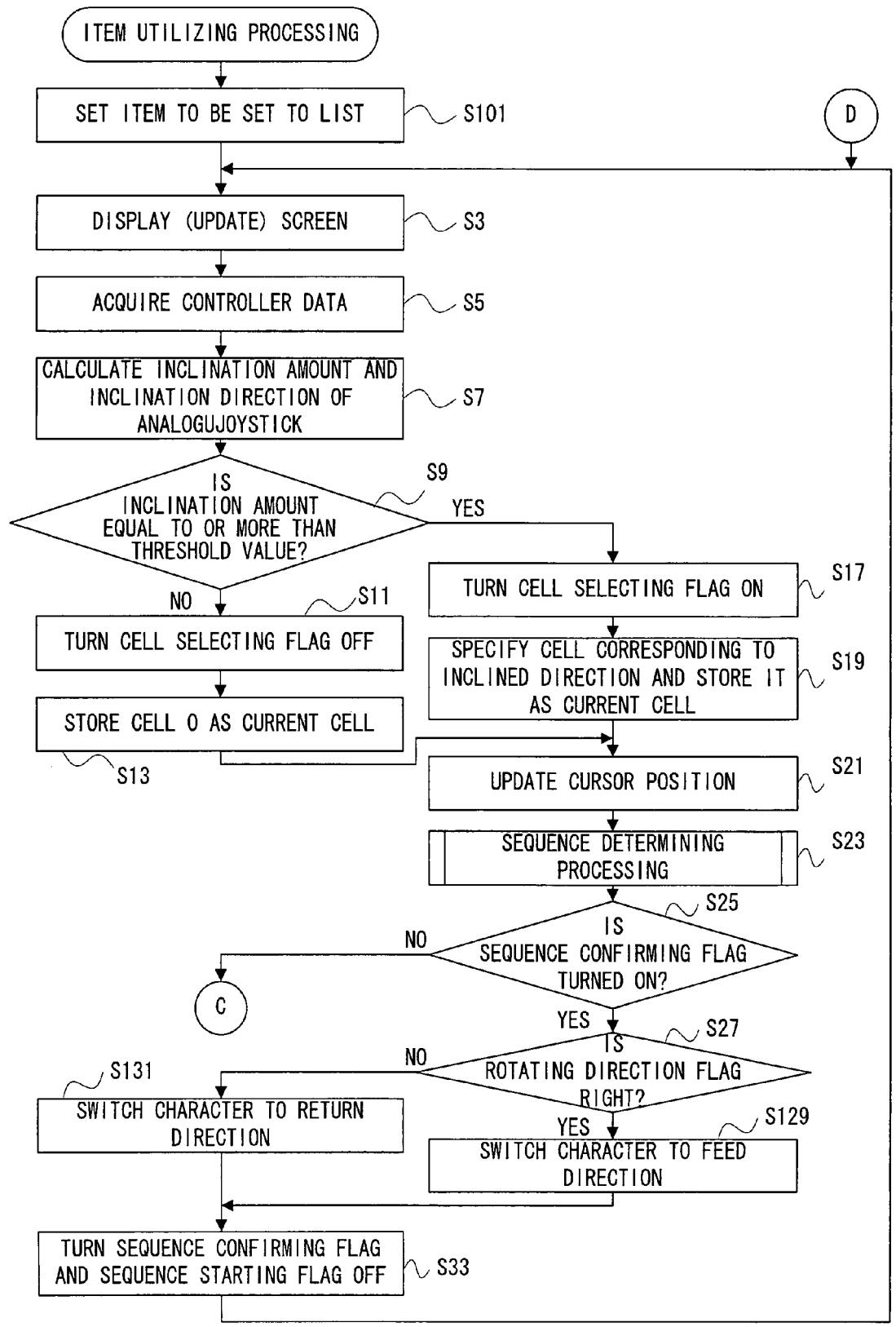
FIG. 28 is a flowchart showing a part of one example of an operation of item utilizing processing in a game of another embodiment.
Figure 29:
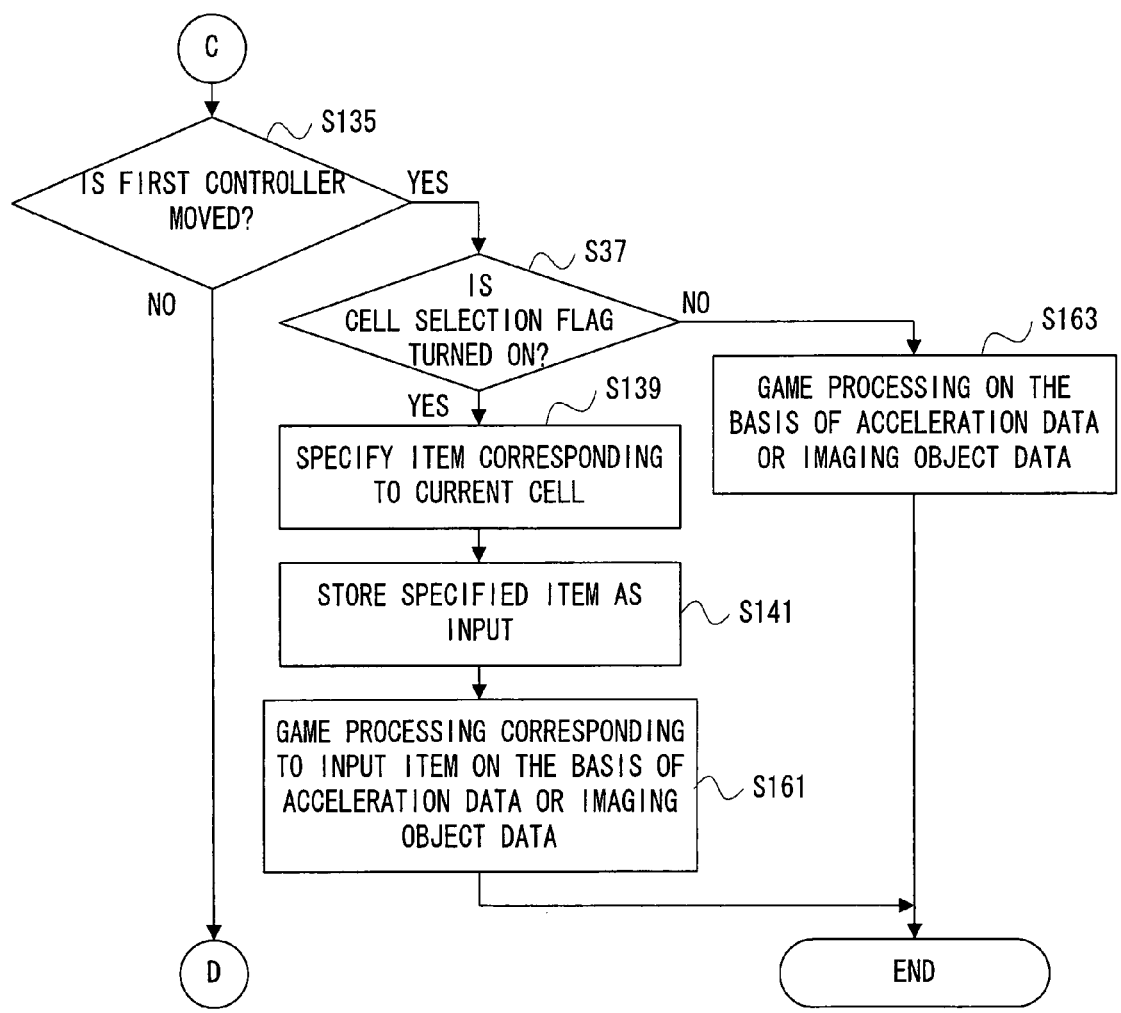
FIG. 29 is a flowchart continued from FIG. 28.

FIG. 28 and FIG. 29 show one example of an operation of item utilizing processing in the game of this embodiment. Steps similar to the above-described character input processing in FIG. 21 and FIG. 22 are identified by the same reference numerals, and the description thereof is omitted.

When starting the processing, in a first step S101 in FIG. 28, the CPU 46 executes an item setting to be included in the list. More specifically, the predetermined number of the items (equal to or less than eight in this embodiment) are selected from item data indicative of a plurality of items, and by bring the items into correspondence with the cells, selection item list data is generated and stored in a memory area 222. Accordingly, in the processing in a next step S3, the list 120 for selecting the items shown in FIG. 27 is displayed on the monitor 30.

In a case that a sequence input is detected, if "YES" in a step 27, the CPU 46 switches the items to a feed direction in a step S129. More specifically, in the selection item list data of the memory area 222, items of the respective cells are replaced with items on the next page. Alternatively, if "NO" in the step S27, the CPU 46 switches items to a return direction in a step S131. More specifically, the selection item list data of the memory area 222 is updated such that the items of the respective cells are replaced with respective items on the previous page. Additionally, in the steps S129 and S131, only a part of the items is replaced with other items. Thus, it is possible to switch the list 120 of the items in response to a sequence input.

Furthermore, in a first step S135 in FIG. 29, the CPU 46 determines whether or not the first controller 34 is moved on the basis of acceleration data of the acceleration sensor 86 or imaging object data (marker coordinate data) of the imaged information arithmetic section 88. That is, it is determined whether or not an operation for executing the game processing in this embodiment is performed. If "NO" in the step S135, the process returns to the step S3 in FIG. 28.

Alternatively, if "YES" in the step S135, and if "YES" in a following step 37, that is, if the first controller 34 is moved in a state that an item is selected by a direction input, it is considered that utilizing the item by the user is determined. Then, the CPU 46 specifies an item corresponding to the current cell in the memory area 228 on the basis of the selection item list data in a step S139. Succeedingly, in a step S141, the CPU 46 stores a specified item in a predetermined area as an input. Then, in a step S161, the CPU 46 executes game processing corresponding to the input item on the basis of the acceleration data or the imaging object data of the first controller 34. Thus, it is possible to utilize the selected item in response to the movement by the first controller 34. The game processing may be controlled on the basis of the acceleration value or the changed amount of acceleration detected by the acceleration sensor 86, or may be controlled on the basis of an instruction position or changes of the instruction position by the first controller 34. For example, in a case that the item is the bomb, game processing is considered like changing a distance at which a bomb is flown depending on the magnitude of acceleration, or flying a bomb in a direction in which an instruction position of the first controller 34 is changed.

On the other hand, if "NO in the step S37, that is, if the first controller 34 is moved in a state that a direction input is not performed, the CPU 46 executes game processing on the basis of the acceleration data or the imaging object data of the first controller 34 in a step S163. In the game processing in this case also, a control may be performed on the basis of the acceleration value or the changed amount of acceleration detected by the acceleration sensor 86, or a control may be made on the basis of an instruction position or changes of the instruction position by the first controller 34. After completion of the step S161 or S163, the item utilizing processing is ended.

In this embodiment, the user can select an item by moving the first controller 34 while selecting an item by a direction input of the analog joystick 94a of the second controller 36, and can play the game on the basis of the selected item and the movement of the first controller 34. Furthermore, while playing the game by moving the first controller 34, the user can switch and select items by an operation of the second controller 36, and therefore, there is no need of suspending the game progress due to the selection and equipment of the item, capable of smoothly playing the game. Thus, it is possible to improve interest of an action game, and a role playing game and a simulation game for a real-time battle.

Additionally, in each of the above-described embodiments, the list 120 showing selection item is displayed on the monitor 30. Displaying the selection items allows the user to select an item while viewing the selection item, and this makes it easy to select an item, and improves operability, but in other embodiment, the list 120 of the selection item may not be displayed. More specifically, the list 120 need not to be displayed in a case that there is no space for displaying the list 120 on the screen, in a case that there is a meaning to make the user remember the arrangement of items in the game, or in a case that a sound like music, a sound effect, or the like are selected. Also, a display field 126 for representing an item which is currently being selected by a direction input may be displayed on the screen. In this case, the item which is currently being selected is clearly noted to the user, and therefore, the user can easily make a selection. In addition, in a case of selecting a sound, a sound itself cannot be displayed, and therefore, a sound corresponding to an item which is currently being selected by a direction input is played from the speaker 32 to make the user listen to it.

Furthermore, in each of the above-described embodiments, an input of the direction for selecting an item is performed by the analog joystick 94a. However, an input device for a direction input is only necessary to perform a continuous direction input operation, and can be changed as necessary. For example, a cross key 82a capable of instructing upper, lower, right and left directions may be used. Alternatively, electrostatic or pressure sensitive track pad (touch pad) may be used, and in this case, an input direction by the user can be detected from a direction of a touched position seen from a reference position of the touch pad, the current touched position seen from the previous touched position, or the like. Pointing devices except for the touch pad, such as a mouse, for example, may be applied.

Although the exemplary embodiments described herein have been described and illustrated in detail, it is clearly understood that the same is by way of illustration and example only and is not to be taken by way of limitation, the spirit and scope of these embodiments being limited only by the terms of the appended claims.

What is claimed is:

1. An information selecting apparatus for making a user select an arbitrary item from a plurality of items, comprising:
    a direction input device allowing an input operation of a direction for inputting direction data indicating a direction in correspondence with an input operation,
    an operating unit for inputting operation data in accordance with a predetermined operation,
    a storage for storing item data indicative of said plurality of items,
    a selection item setter for setting the predetermined number of the items out of said item data as selection items which are brought into correspondence with a predetermined direction,
    a selector for selecting from said selection items an item corresponding to said direction data from said direction input device, and outputting said item when a predetermined operation data is input,
    a sequence input determiner for determining whether or not a predetermined series of direction input operations is performed according to a pattern on the basis of a manner of change of said direction data, the predetermined series of direction input operations being performed according to the pattern by rotation of the direction input device around a neutral position of the direction input device, and
    a switching unit for switching items out of the selection items to other items of said item data when it is determined that said predetermined series of direction input operations is performed according to the pattern by said sequence input determiner.

2. An information selecting apparatus according to claim 1, wherein
    said direction input device includes a stick capable of being inclined, and inputs said direction data in correspondence with an inclined angle of said stick, and
    said sequence input determiner determines whether or not the predetermined series of direction input operations is performed according to the pattern by determining whether or not said stick is rotated once on the basis of the shift of said direction data.

3. An information selecting apparatus according to claim 1, wherein
    said operating unit includes a pushable key, and inputs key information in accordance with an operation by said key as said operation data.

4. An information selecting apparatus according to claim 1, further comprising:
    a display controller for displaying on display said selection items set by said selection item setter and said switching unit.

5. An information selecting apparatus according to claim 1, wherein
    said item is a character or a character string, and further comprising a character input processor for processing the character or character string output by said selector as an input.

6. A non-transitory computer-readable storage medium storing information selecting program executed in a computer of an information selecting apparatus having a direction input device allowing an input operation of a direction for inputting direction data indicating a direction in correspondence with an input operation, an operating unit for inputting operation data in accordance with a predetermined operation, a storage for storing item data indicative of said plurality of items, and allowing a user to select an arbitrary item from said plurality of items, wherein
    said information selecting program causes said computer to execute:
    setting the predetermined number of the items out of said item data as selection items which are brought into correspondence with a predetermined direction,
    selecting from said selection items an item corresponding to said direction data from said direction input device, and outputting said item when a predetermined operation data is input,
    determining whether or not a predetermined series of direction input operations is performed according to a pattern on the basis of a manner of change of said direction data, the predetermined series of direction input operations being performed according to the pattern by rotation of the direction input device around a neutral position of the direction input device, and
    switching items out of the selection items to other items of said item data when it is determined that said predetermined series of direction input operations is performed according to the pattern.

7. A game apparatus performing game processing according to an item selected by a user out of a plurality of items, comprising:
    a first operation unit for inputting first operation data in accordance with a predetermined operation,
    a second operation unit allowing an input operation of a direction and including at least a direction input device for inputting direction data indicative of a direction in correspondence with said input operation,
    an acquisition unit for respectively acquiring said first operation data and said direction data from said first operation unit and said second operation unit,
    a storage unit for storing item data indicative of said plurality of items,
    a selection item setter for setting the predetermined number of the items out of said item data as selection items which are brought into correspondence with a predetermined direction,
    a selector for selecting from said selection items an item corresponding to said direction data from said direction input device,
    a sequence input determiner for determining whether or not a predetermined series of direction input operations is performed according to a pattern on the basis of a manner of change of said direction data, the predetermined series of direction input operations being performed according to the pattern by rotation of the direction input device around a neutral position of the direction input device,
    a switching unit for switching items out of the selection items to other items of said item data when it is determined that said predetermined series of direction input operations is performed according to the pattern by said sequence input determiner, and
    a game processor for executing game processing on the basis of said item selected by said selector and said first operation data.

8. A game apparatus according to claim 7, wherein
    said first operation unit includes a movement detector for detecting its own movement,
    said first operation data includes the movement data detected by said movement detector, and
    said game processor executes game processing on the basis of said item selected by said selector and said movement data.

9. A game apparatus according to claim 8, wherein
said first operation unit is provided with an acceleration sensor as said movement detector, and
said game processor performs said game processing on the basis of said item selected by said selector and the acceleration data acquired by said acceleration sensor.

10. A game apparatus according to claim 8, wherein
said first operation unit is provided with an imaging device as said movement detector, and
said game processor executes said game processing on the basis of said item selected by said selector and imaging object data indicative of a position of an imaging object captured by said imaging device.

11. A non-transitory computer-readable storage medium storing a game program to be executed in a computer of a game apparatus having a first operation unit for inputting first operation data in accordance with a predetermined operation, a second operation unit allowing an input operation of a direction and including at least a direction input device for inputting direction data indicative of a direction in correspondence with said input operation, and a storage for storing item data indicative of a plurality of items, and performing game processing according to an item selected by a user out of said plurality of items, wherein said game program causes said computer to execute:
respectively acquiring said first operation data and said direction data from said first operation unit and said second operation unit,
setting the predetermined number of the items out of said item data as selection items which are brought into correspondence with a predetermined direction,
selecting from said selection items an item corresponding to said direction data from said direction input device,
determining whether or not a predetermined series of direction input operations is performed according to a pattern on the basis of a manner of change of said direction data, the predetermined series of direction input operations being performed according to the pattern by rotation of the direction input device around a neutral position of the direction input device,
switching items out of the selection items to other items of said item data when it is determined that said predetermined series of direction input operations is performed according to the pattern, and
performing game processing on the basis of said selected item and said first operation data.

12. An information selecting system for making a user select an arbitrary item from a plurality of items, comprising:
a direction input device allowing an input operation of a direction for inputting direction data indicating a direction in correspondence with an input operation,
an operating unit for inputting operation data in accordance with a predetermined operation,
a storage for storing item data indicative of said plurality of items,
a selection item setter for setting the predetermined number of the items out of said item data as selection items which are brought into correspondence with a predetermined direction,
a selector for selecting from said selection items an item corresponding to said direction data from said direction input device, and outputting said item when a predetermined operation data is input,
a sequence input determiner for determining whether or not a predetermined series of direction input operations is performed according to a pattern on the basis of a manner of change of said direction data, the predetermined series of direction input operations being performed according to the pattern by rotation of the direction input device around a neutral position of the direction input device, and
a switching unit for switching items out of the selection items to other items of said item data when it is determined that said predetermined series of direction input operations is performed according to the pattern by said sequence input determiner.

13. A method of allowing a user to select an arbitrary item from a plurality of items in an information selecting apparatus having a direction input device allowing an input operation of a direction for inputting direction data indicating a direction in correspondence with an input operation, an operating unit for inputting operation data in accordance with a predetermined operation and a memory for storing item data indicative of said plurality of items, comprising:
setting the predetermined number of the items out of said item data as selection items which are brought into correspondence with a predetermined direction,
selecting from said selection items an item corresponding to said direction data from said direction input device, and outputting said item when a predetermined operation data is input,
determining whether or not a predetermined series of direction input operations is performed according to a pattern on the basis of a manner of change of said direction data, the predetermined series of direction input operations being performed according to the pattern by rotation of the direction input device around a neutral position of the direction input device, and
switching items out of the selection items to other items of said item data when it is determined that said predetermined series of direction input operations is performed according to the pattern.

14. A game system performing game processing according to an item selected by a user out of a plurality of items, comprising:
a first operation unit for inputting first operation data in accordance with a predetermined operation,
a second operation unit allowing an input operation of a direction and including at least a direction input device for inputting direction data indicative of a direction in correspondence with said input operation,
an acquisition unit for respectively acquiring said first operation data and said direction data from said first operation unit and said second operation unit,
a memory for storing item data indicative of said plurality of items,
a selection item setter for setting the predetermined number of the items out of said item data as selection items which are brought into correspondence with a predetermined direction,
a selector for selecting from said selection items an item corresponding to said direction data from said direction input device,
a sequence input determiner for determining whether or not a predetermined series of direction input operations is performed according to a pattern on the basis of a manner of change of said direction data, the predetermined series of direction input operations being performed according to the pattern by rotation of the direction input device around a neutral position of the direction input device,
a switching unit for switching items out of the selection items to other items of said item data when it is determined that said predetermined series of direction input operations is performed according to the pattern by said sequence input determiner, and a game processor for executing game processing on the basis of said item selected by said selector and said first operation data.

15. A method of performing game processing according to an item selected by a user out of a plurality of items in a game system having a first operation unit for inputting first operation data in accordance with a predetermined operation, a second operation unit allowing an input operation of a direction and including at least a direction input device for inputting direction data indicative of a direction in correspondence with said input operation, and a memory for storing item data indicative of a plurality of items, comprising:

respectively acquiring said first operation data and said direction data from said first operation unit and said second operation unit, setting the predetermined number of the items out of said item data as selection items which are brought into correspondence with a predetermined direction, selecting from said selection items an item corresponding to said direction data from said direction input device, determining whether or not a predetermined series of direction input operations is performed according to a pattern on the basis of a manner of change of said direction data, the predetermined series of direction input operations being performed according to the pattern by rotation of the direction input device around a neutral position of the direction input device, switching items out of the selection items to other items of said item data when it is determined that said predetermined series of direction input operations is performed according to the pattern, and performing game processing on the basis of said selected item and said first operation data.

16. An information selecting apparatus for making a user select an arbitrary item from a plurality of items, comprising:

a direction input device configured to allow an input operation of a direction for inputting direction data indicating a direction in correspondence with an input operation, an operating unit configured to input operation data in accordance with a predetermined operation, a storage configured to store item data indicative of said plurality of items, a selection item setter configured to set the predetermined number of the items out of said item data as selection items which are brought into correspondence with a predetermined direction, a display controller configured to display a relationship between the selection items set by said selection item setter and a direction brought into correspondence with the selection items, a selector configured to select from said selection items an item corresponding to said direction data from said direction input device, and output said item when a predetermined operation data is input, a sequence input determiner configured to determine whether or not a predetermined series of direction input operations is performed according to a pattern on the basis of a shift manner of change of said direction data, the predetermined series of direction input operations being performed according to the pattern by rotation of the direction input device around a neutral position of the direction input device, and a switching unit configured to switch items out of the selection items to other items of said item data when it is determined that said predetermined series of direction input operations is performed according to the pattern by said sequence input determiner.

* * * * *